United States Patent
Prasad et al.

(10) Patent No.: US 11,856,051 B2
(45) Date of Patent: *Dec. 26, 2023

(54) CONFIGURING CONTROL DEVICES OPERABLE FOR A LOAD CONTROL ENVIRONMENT

(71) Applicant: Lutron Technology Company LLC, Coopersburg, PA (US)

(72) Inventors: Ram Kripal Prasad, Royersford, PA (US); Saurabh Garg, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,030

(22) Filed: Aug. 15, 2022

(65) Prior Publication Data

US 2023/0038564 A1   Feb. 9, 2023

Related U.S. Application Data

(63) Continuation of application No. 17/328,721, filed on May 24, 2021, now Pat. No. 11,418,579, which is a
(Continued)

(51) Int. Cl.
*G06F 15/177* (2006.01)
*H04L 67/1001* (2022.01)
(Continued)

(52) U.S. Cl.
CPC ..... *H04L 67/1001* (2022.05); *G06Q 30/0621* (2013.01); *G06Q 30/0641* (2013.01);
(Continued)

(58) Field of Classification Search
CPC ..... H04L 67/1001; H04L 67/34; H04L 47/70; G06Q 30/0621; G06Q 30/0641; G06Q 50/06
(Continued)

(56) References Cited

U.S. PATENT DOCUMENTS 5,963,953 A   10/1999   Cram et al.
6,948,136 B2   9/2005   Trewin
(Continued)

OTHER PUBLICATIONS

Chevrolet website, http://www.chevrolet.com/camaro-sports-car/build-your-own.html?x-zipcode=19019&seo=goo_%7C_GM+Chevy+Retention_%7C_GMNA%7CUS%7CCHV%7CGOOG%7CS%7CBD%7CA%7CEX%7CRTN%7CCHV%7CDIV%7C0%7C0%7CChevrolet-GX-KWs-DIV-IM%7CNA%7CNA%7CNA_%7C_Chevrolet_% Last visited Mar. 2016.
(Continued)

*Primary Examiner* — Bharat Barot
(74) *Attorney, Agent, or Firm* — Michael Czarnecki; Glen Farbanish; Philip Smith

(57) ABSTRACT

A control device configuration system may receive, store, process, and/or display control device configuration information. The control device configuration system may filter the control device configuration information based on user selections of configuration options for configuration parameters. The control device configuration system may identify compatible and incompatible configuration options for various configuration parameters. The control device configuration system may allow selections of the incompatible configuration options. The control device configuration system may adjust how it filters the control device configuration information based on the selections of the incompatible configuration options. The control device configuration system may implement a configuration model that includes
(Continued)

configuration parameter groups for efficient evaluation of user selections.

15 Claims, 15 Drawing Sheets

Related U.S. Application Data continuation of application No. 16/588,973, filed on Sep. 30, 2019, now Pat. No. 11,019,135, which is a continuation of application No. 15/468,070, filed on Mar. 23, 2017, now Pat. No. 10,432,705.

(60) Provisional application No. 62/312,416, filed on Mar. 23, 2016.

(51) Int. Cl.
  *G06Q 30/0601* (2023.01)
  *G06Q 50/06* (2012.01)
  *H04L 47/70* (2022.01)
  *H04L 67/00* (2022.01)

(52) U.S. Cl.
  CPC .............. *G06Q 50/06* (2013.01); *H04L 47/70* (2013.01); *H04L 67/34* (2013.01)

(58) Field of Classification Search
  USPC .................................................. 709/220–222
  See application file for complete search history.

(56) References Cited

U.S. PATENT DOCUMENTS

| | | |
|---|---|---|
| 7,421,484 B2 | 9/2008 | Das |
| 8,145,633 B1 | 3/2012 | Manolis et al. |
| 8,364,513 B2 | 1/2013 | Mitchell et al. |
| 8,458,305 B2 | 6/2013 | Elzur et al. |
| 8,638,692 B2 | 1/2014 | Gale et al. |
| 9,020,932 B2 | 4/2015 | Gopinath et al. |
| 9,898,175 B2 | 2/2018 | Fiedler |
| 10,432,705 B2* | 10/2019 | Prasad ............... G06Q 30/0641 |
| 11,019,135 B2 | 5/2021 | Prasad et al. |
| 11,467,919 B2* | 10/2022 | Raghuram .......... H04L 67/1095 |
| 2002/0156694 A1 | 10/2002 | Christensen et al. |
| 2004/0064597 A1 | 4/2004 | Trewin |
| 2009/0292375 A1* | 11/2009 | Thompson ....... H04N 21/42221 700/86 |
| 2010/0138764 A1* | 6/2010 | Hatambeiki ..... H04N 21/42208 715/765 |
| 2011/0276168 A1 | 11/2011 | Schmidtke et al. |
| 2014/0188655 A1 | 7/2014 | Johnson et al. |
| 2014/0222977 A1 | 8/2014 | Varney et al. |
| 2015/0167989 A1* | 6/2015 | Matsuoka .......... H04L 12/2803 700/276 |
| 2015/0295411 A1 | 10/2015 | Courtney et al. |
| 2015/0331021 A1* | 11/2015 | Umamoto .............. G06Q 50/06 324/103 R |
| 2016/0337359 A1* | 11/2016 | Hojsik .................... H04L 67/34 |

OTHER PUBLICATIONS

Amazon website, http://www.amazon.com/gp/search/ref=sr_nr_p_n_size_browse-bin_2?fst=as%3Aoff&rh=n%3A172282%2Cn%3A541966%2Cn%3A1232597011%2Ck%3Aipad%2Cp_n_feature_keywords_two_browse-bin%3A6567834011%2Cp_n_size_browse-bin%3A7817237011&keywords=ipad&ie=UTF8&qid=1453825896&rnid=1254615011, Last visited Mar. 2016.

Blindsgalore website, http://www.blindsgalore.com/WindowProduct.asp?id=254306, Last visited Mar. 2016.

Target website, http://www.target.com/s?searchTerm=lego&category=0&view=medium&iec=0&facets=d_gender_all:Boy|d_brand_all:LEGO|d_age_all:5|d_character_all:No%20License|d_rating:4&resultsPerPage=60&sort=relevance&customPrice=true&minPrice=25&maxPrice=30&s=y, Last visited Mar. 2016.

Trulia website, http://www.trulia.com/for_sale/19103_zip/4000p_sqft/APARTMENT%7CCONDO%7CTOWNHOUSE,CONDO,TOWNHOUSE,APARTMENT_type/, Last visited Mar. 2016.

\* cited by examiner

| Configuration Parameter ID | Configuration Options | Group Identifiers | Selected Option | Valid Configuration Options | Priority? |
|---|---|---|---|---|---|
| Size (Height/Width) | 1. 150x150<br>2. 150x155<br>... | Group 1<br>Group 2<br>... | 1. 150x150 | 1. 150x150 | Y |
| Mounting Type | 1. Inside<br>2. Outside<br>... | Group 1<br>Group 2<br>... | 1. Inside | 1. Inside | |
| Fabric Type | 1. CHARTREUX 1.00 % MODE PF-608-1<br>2. LOUTRE 1.00 % MODE PF-609-1<br>... | Group 1 | Null | 1. CHARTREUX 1.00 % MODE PF-608-1<br>2. LOUTRE 1.00 % MODE PF-609-1<br>... | |
| Control Type | 1. Savoia QS<br>2. Contract Roller<br>... | Group 2 | Null | 1. Savoia QS<br>2. Contract Roller<br>... | |
| Operator Type | 1. Roller 64<br>2. Roller 100<br>... | Group 2 | Null | 1. Roller 64<br>2. Roller 100<br>... | |
| ... | | | | ... | ... |

Fig. 6

CONFIGURING CONTROL DEVICES OPERABLE FOR A LOAD CONTROL ENVIRONMENT

CROSS-REFERENCE TO RELATED APPLICATIONS

This application is a continuation of U.S. Non-provisional patent application Ser. No. 17/328,721, filed on May 24, 2021, now U.S. Pat. No. 11,418,579, issued Aug. 16, 2022, which is a continuation of U.S. Non-provisional patent application Ser. No. 16/588,973, filed on Sep. 30, 2019, now U.S. Pat. No. 11,019,135, issued on May 25, 2021, which is a continuation of U.S. Non-provisional patent application Ser. No. 15/468,070, filed Mar. 23, 2017, now U.S. Pat. No. 10,432,705, issued on Oct. 1, 2019, which claims priority to U.S. Provisional Patent Application No. 62/312,416, filed Mar. 23, 2016, the entire disclosures of which are incorporated by reference herein.

BACKGROUND

A user environment, such as a residence or an office building, may include a load control system that may be installed therein for controlling electrical loads. The load control system may include various types of load control devices (e.g., motorized window treatments or lighting control devices) for controlling the electrical loads. The load control devices may be characterized by various types of features including sizes, mounting techniques, colors, load ratings, etc. For example, a motorized window treatment may be configured in various sizes, mounting techniques, colors, etc.

A proposed load control device may be configured/designed by identifying one of a number of options for each feature of the load control device, for example, before the load control device is purchased and installed. In other words, in many cases a user may be able to design a customized device. Some combinations of the features may be compatible with actual product configurations, while others may not. Current software may allow for a user to select from a list of configuration options available for each feature of a load control device and submit the selected features in a proposal to determine whether the selected options are available for configuration of the load control device. For example, a user may select a size of a motorized window treatment, fabric type, motor size, width for each panel, mounting type, top treatment, light block, flap, hanger, operator, power, chain drop, chain type, operator side, brackets, hembar, fabric drop, fabric face, railroading, custom seams, seam location, battens, split top treatment, sill angle, side channel, lineal color, fascia end cap color, mounting spacer, custom light gaps, light gap between panels, width type, operator color, tube size, and coupler type.

Due to the large number of features to be defined for configuring a load control device and the large number of options available for each feature, the memory and processing requirements used for evaluating the valid and invalid combinations for each of these options after the proposal is submitted to determine whether the selected options meet an actual product configuration are inefficient. Additionally, the options selected for the proposed load control device may be incompatible or aesthetically unappealing. For example, the user may select options for the motor size of a window treatment that do not support the size of the window treatment or the weight of the fabric of the window treatment. As the software is evaluating selected options for the features of a proposed load control device as a whole, the display configuration of current software may be inefficient, as the user may have to wait until after options have been selected for each feature before the user is notified that any of the selected features are invalid features for a valid load control device.

Further, due to the validity of the load control device being evaluated after the selection of each of the features, the user may be relatively uninformed regarding the cost of the individual features being selected. Instead, the user may be provided with the cost of the configuration of the control device based on totality of the selected options, though the user may be relatively uninformed as to the cost of each feature. Hence, a user may spend large amounts of time selecting all options to configure a load control device only to then determine that the price of the device exceeds a desired maximum price the user may wish to spend.

SUMMARY

A control device configuration system is described herein for configuring control devices to be installed in a load control environment. A control device configuration system may comprise an order management device and/or network devices that communicate with the order management device through a network. The order management device and/or the network devices may receive, store, process, and/or display control device configuration information. The control device configuration information may be associated with actual product configurations.

A network device may perform various tasks. The network device may store control device configuration information. The network device may receive filtering criterion to filter the control device configuration information. The network device may receive a selection of a configuration option for a configuration parameter and may use the selected configuration option for the configuration parameter as a filter criteria to filter the control device configuration information. The network device may determine whether the filtering criteria is compatible with previously selected filtering criterion. The network device may remove an incompatible filtering criteria. The network device may adjust the previously selected filtering criterion to resolve the incompatibility. The order management device may perform some or all of the tasks that are carried out by the network device.

For example, a network device may receive a user selection of a configuration parameter. The network device may send the user selection of the configuration parameter to the order management device. The order management device may retrieve configuration options associated with the selected configuration parameter. The order management device may determine which ones of the configuration options are compatible with previously selected configuration options for other configuration parameters and which ones are incompatible. The order management device may communicate the determination back to the network device such that the network device may display the compatible configuration options for the selected configuration parameter along with the incompatible configuration options. The network device may dynamically update the display of the compatible and incompatible configuration options for the selected configuration parameter as the user selects a configuration option for another configuration parameter. The network device may indicate the division of the compatible and incompatible configuration options with a banner or a line. The banner or line may move within the display of the compatible and incompatible configuration options. The compatible and incompatible configuration options may be displayed in a pull-down window. The network device may dynamically update a price range for the selection of control device configurations.

If the network device receives a user selection of an incompatible configuration option, the network device may send the user selection back to the order management device. The order management device, upon receiving the user selection of the incompatible configuration option, may identify one or more previously selected configuration options for other configuration parameters to resolve incompatibility. The network device may replace the one or more previously selected configuration options for other configuration parameters with default options. The network device may generate an alert when the user selects the incompatible configuration option for the selected configuration parameter. The alert may be an error message. The error message may identify the other configuration parameters defined with the previously selected incompatible configuration options and/or recommend changes to resolve incompatibility. The error message may include an option to close the error message and continue with the user's selection of the incompatible configuration option.

Configuration models may be implemented to increase the efficiency of searching through the control device configuration information to identify compatible and incompatible configurations options in the control device configuration information from the filtering criterion. Each type of control device may have a corresponding configuration model that may be implemented to increase processing efficiency. A configuration model may comprise a set of control device configuration parameters for a given type of control device (e.g., shade, lighting device, etc.). Each configuration model may have a configuration parameter definition for each configuration parameter that includes a name/identifier of the control device configuration parameter, a set of available configuration options for the configuration parameter (e.g., a range of values, a list of options, a list of ranges, etc.), one or more group identifier(s), a selected option (from the set of options) selected by a user for the configuration parameter, and/or valid configuration options.

To enable faster processing and display of results in response to user selections, each configuration parameter may be assigned to one or more configuration parameter groups identified by the group identifiers. A configuration parameter group may be a set of two or more configuration parameters that may impact each other in response to selection of corresponding configuration options. After a user selection of a configuration option for a given parameter, the valid configuration options may be analyzed and/or updated for each parameter in the same group.

While various examples are provided herein for providing control device configurations, the examples are not meant to be limiting.

BRIEF DESCRIPTION OF THE DRAWINGS

FIG. 6 illustrates example parameter definitions of configuration parameters for a roller shade that may be updated according to a configuration model.

DETAILED DESCRIPTION

The foregoing summary, as well as the following detailed description, may be better understood when read in conjunction with the appended drawings. The drawings are shown for purposes of illustration and are non-limiting.

Figure 1:
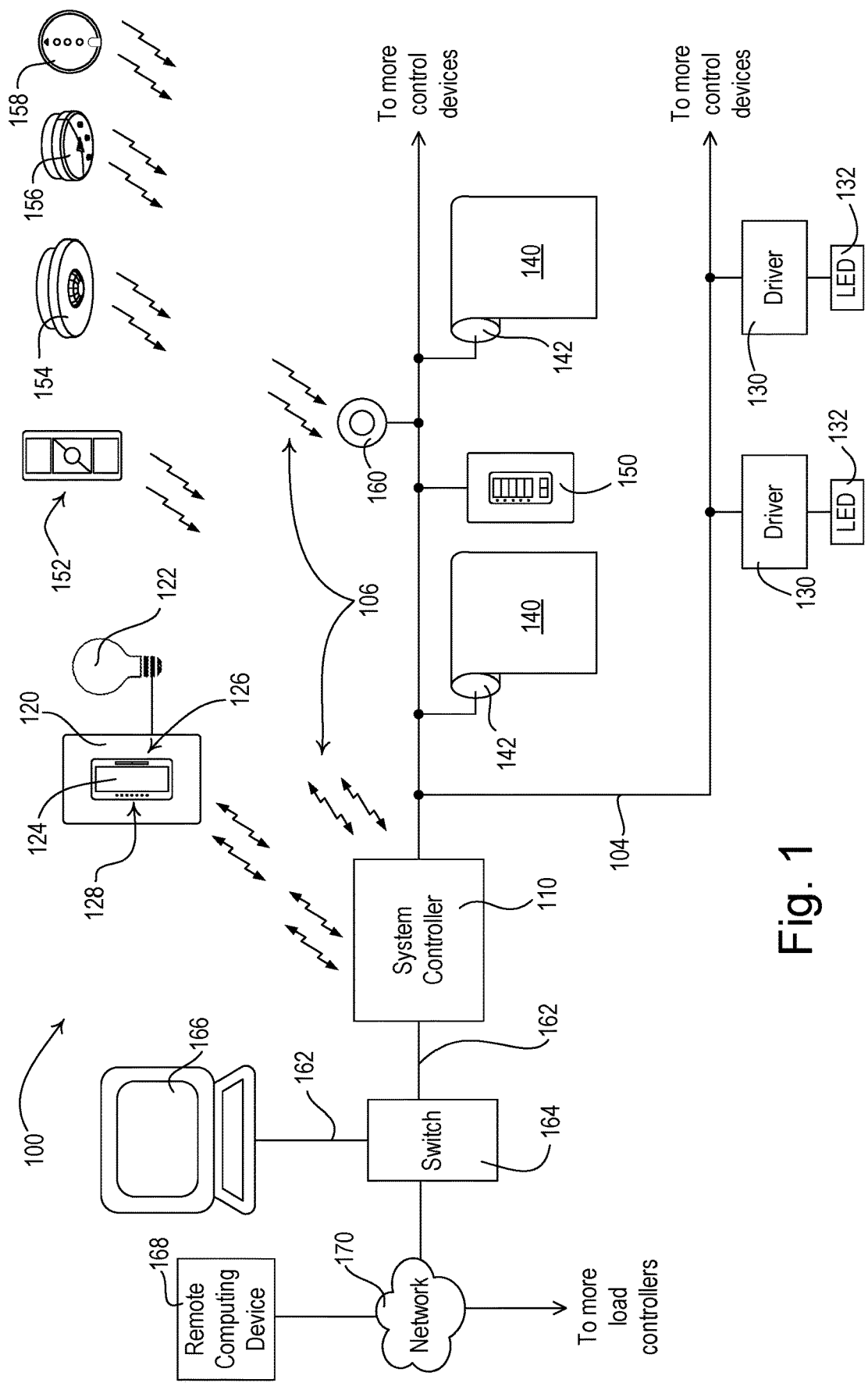
FIG. 1 depicts a block diagram of an example load control system.

FIG. 1 is a diagram of an example load control system 100 for controlling the amount of power delivered from an alternating-current (AC) power source (not shown) to one or more electrical loads. The load control system 100 may comprise a system controller 110 operable to transmit and/or receive digital messages via a wired and/or a wireless communication link. For example, the system controller 110 may be coupled to one or more wired control devices via a wired digital communication link 104. The system controller 110 may be configured to transmit and/or receive wireless signals, e.g., radio-frequency (RF) signals 106, to communicate with one or more wireless control devices.

The load control system 100 may comprise a number of control devices. The control devices may include control-source devices and/or control-target devices for controlling an electrical load. The control-source devices may be input devices operable to transmit digital messages configured to control an electrical load via a control-target device. For example, control-source devices may transmit the digital messages in response to a triggering condition, such as user input, occupancy/vacancy conditions, changes in measured light intensity, etc. The control-target devices may be load control devices operable to receive digital messages and control respective electrical loads in response to the received digital messages. A single control device of the load control system 100 may operate as both a control-source and a control-target device. The system controller 110 may be configured to receive digital messages from the control-source devices and transmit digital messages to the control-target devices in response to the digital messages received from the control-source devices.

The load control system 100 may comprise a load control device, such as a dimmer switch 120, for controlling a lighting load 122. The dimmer switch 120 may be adapted to be wall-mounted in a standard electrical wallbox. The dimmer switch 120 may comprise a tabletop or plug-in load control device. The dimmer switch 120 may comprise a toggle actuator 124 (e.g., a button) and/or an intensity adjustment actuator 126 (e.g., a rocker switch). Successive actuations of the toggle actuator 124 may toggle, e.g., turn off and on, the lighting load 122. Actuations of an upper portion or a lower portion of the intensity adjustment actuator 126 may respectively increase or decrease the amount of power delivered to the lighting load 122 and increase or decrease the intensity of the lighting load from a minimum intensity (e.g., approximately 1%) to a maximum intensity (e.g., approximately 100%). The dimmer switch 120 may further comprise a plurality of visual indicators 128, e.g., light-emitting diodes (LEDs), which may be arranged in a linear array and/or may be illuminated to provide feedback of the intensity of the lighting load 122. Examples of wall-mounted dimmer switches are described in greater detail in U.S. Pat. No. 5,248,919, issued Sep. 28, 1993, entitled LIGHTING CONTROL DEVICE, and U.S. Patent Application Publication No. 2014/0132475, published May 15, 2014, entitled WIRELESS LOAD CONTROL DEVICE, the entire disclosures of which are hereby incorporated by reference.

The dimmer switch 120 may be configured to receive digital messages from the system controller 110 via the RF signals 106 and to control the lighting load 122 in response to the received digital messages. Examples of dimmer switches operable to transmit and receive digital messages is described in greater detail in U.S. Patent Application Publication No. 2009/0206983, published Aug. 20, 2009, entitled COMMUNICATION SYSTEM FOR A RADIO-FREQUENCY LOAD CONTROL SYSTEM, the entire disclosure of which is hereby incorporated by reference. The dimmer switch 120 may also, or alternatively, be coupled to the wired digital communication link 104.

The load control system 100 may comprise one or more remotely-located load control devices, such as light-emitting diode (LED) drivers 130 for driving respective LED light sources 132 (e.g., LED light engines). The LED drivers 130 may be located remotely, for example, in the lighting fixtures of the respective LED light sources 132. The LED drivers 130 may be configured to receive digital messages from the system controller 110 via the digital communication link 104 and to control the respective LED light sources 132 in response to the received digital messages. The LED drivers 130 may be coupled to a separate digital communication link, such as an Ecosystem® or digital addressable lighting interface (DALI) communication link, and the load control system 100 may include a digital lighting controller coupled between the digital communication link 104 and the separate communication link. The LED drivers 132 may include internal RF communication circuits or be coupled to external RF communication circuits (e.g., mounted external to the lighting fixtures, such as to a ceiling) for transmitting and/or receiving the RF signals 106. The load control system 100 may comprise other types of remotely-located load control devices, such as, for example, electronic dimming ballasts for driving fluorescent lamps.

The load control system 100 may further comprise a plurality of daylight control devices to control the amount of daylight entering the building in which the load control system may be installed. The daylight control devices may be motorized window treatments 140, such as motorized roller shades. Each motorized window treatment 140 may comprise a covering material (e.g., a shade fabric). The covering material may be wound around a roller tube for raising and/or lowering the shade fabric. Each motorized window treatment 140 may comprise an electronic drive unit (EDU) 142. If the motorized window treatment is a motorized roller shade, the electronic drive unit 142 may be located inside the roller tube of the motorized roller shade. The electronic drive units 142 may be coupled to the digital communication link 104 for transmitting and/or receiving digital messages. The electronic drive units 142 may include a control circuit that may be configured to adjust the position of a window treatment fabric in response to digital messages received from the system controller 110 via the digital communication link 104. Each of the electronic drive units 142 may include memory for storing association information for associations with other devices and/or instructions for controlling the motorized window treatments 140. Each electronic drive unit 142 may also, or alternatively, comprise an internal RF communication circuit or be coupled to an external RF communication circuit (e.g., located outside of the roller tube for motorized roller shades) for transmitting and/or receiving the RF signals 106. While the motorized window treatments 140 are illustrated in FIG. 1 as a motorized roller shade, one or more of the motorized window treatments 140 may comprise other types of daylight control devices, such as a cellular shade, a drapery, a Roman shade, a Venetian blind, a Persian blind, a pleated blind, a tensioned roller shade systems, an electrochromic or smart window, and/or other suitable daylight control device.

The load control system 100 may comprise one or more other types of load control devices, such as a screw-in luminaire including a dimmer circuit and an incandescent or halogen lamp; a screw-in luminaire including a ballast and a compact fluorescent lamp; a screw-in luminaire including an LED driver and an LED light source; an electronic switch, a controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of a heating, ventilation, and air conditioning (HVAC) system; an air conditioner; a compressor; an electric baseboard heater controller; a controllable damper; a variable air volume controller; a fresh air intake controller; a ventilation controller; hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and/or an alternative energy controller.

The load control system 100 may comprise one or more control-source devices, such as a wired keypad device 150, a battery-powered remote control device 152, an occupancy sensor 154, a daylight sensor 156, and/or a radio window sensor 158. The wired keypad device 150 may be configured to transmit digital messages to the system controller 110 via the digital communication link 104 in response to an actuation of one or more buttons of the wired keypad device 150. The battery-powered remote control device 152, the occupancy sensor 154, the daylight sensor 156, and/or the radio window sensor 158 may be wireless control devices (e.g., RF transmitters) configured to transmit digital messages to the system controller 110 via the RF signals 106. For example, the battery-powered remote control device 152 may be configured to transmit digital messages to the system controller 110 via the RF signals 106 in response to an actuation of one or more buttons of the battery-powered remote control device 152. The occupancy sensor 154 may be configured to transmit digital messages to the system controller 110 via the RF signals 106 in response to detection of occupancy and/or vacancy conditions in the space in which the load control system 100 is installed. The daylight sensor 156 may be configured to transmit digital messages to the system controller 110 via the RF signals 106 in response to detection of different amounts of natural daylight intensity. The radio window sensor 158 may be configured to transmit digital messages to the system controller 110 via the RF signals 106 in response to detection of an exterior daylight intensity coming from outside the space in which the load control system 100 is installed.

The system controller 110 may be configured to transmit one or more digital messages to the load control devices (e.g., the dimmer switch 120, the LED drivers 130, and/or motorized window treatments 140) in response to the received digital messages, e.g., from the wired keypad device 150, the battery-powered remote control device 152, the occupancy sensor 154, the daylight sensor 156, and/or the radio window sensor 158. While the system controller 110 may receive digital messages from the control-source devices and/or transmit digital messages to the load control devices for controlling an electrical load, the control-source devices may communicate directly with the load control devices for controlling the electrical load.

The load control system 100 may comprise a wireless adapter device 160 that may be coupled to the digital communication link 104. The wireless adapter device 160 may be configured to receive the RF signals 106. The wireless adapter device 160 may be configured to transmit a digital message to the system controller 110 via the digital communication link 104 in response to a digital message received from one of the wireless control devices via the RF signals 106. For example, the wireless adapter device 160 may re-transmit the digital messages received from the wireless control devices on the digital communication link 104.

The occupancy sensor 154 may be configured to detect occupancy and/or vacancy conditions in the space in which the load control system 100 is installed. The occupancy sensor 154 may transmit digital messages to the system controller 110 via the RF signals 106 in response to detecting the occupancy and/or vacancy conditions. The system controller 110 may be configured to turn one or more of the lighting load 122 and/or the LED light sources 132 on and off in response to receiving an occupied command and a vacant command, respectively. The occupancy sensor 154 may operate as a vacancy sensor, such that the lighting loads are turned off in response to detecting a vacancy condition (e.g., not turned on in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 156 may be configured to measure a total light intensity detected in the space in which the load control system 100 may be installed. The daylight sensor 156 may transmit digital messages including the measured light intensity to the system controller 110 via the RF signals 106. The digital messages may be used to control an electrical load (e.g., the intensity of lighting load 122, the motorized window treatments 140 for controlling the position of the covering material, the intensity of the LED light sources 132, etc.) via one or more control load control devices (e.g., the dimmer switch 120, the electronic drive unit 142, the LED driver 130, etc.). Examples of RF load control systems having daylight sensors are described in greater detail in commonly-assigned U.S. Pat. No. 8,410,512, issued Apr. 2, 2013, entitled SOLID STATE LIGHT EMITTING APPARATUS WITH THERMAL MANAGEMENT STRUCTURES AND METHODS OF MANUFACTURING; and U.S. Pat. No. 8,451,116, issued May 28, 2013, entitled WIRELESS BATTERY-POWERED DAYLIGHT SENSOR, the entire disclosures of which are hereby incorporated by reference.

The radio window sensor 158 may be configured to measure an exterior light intensity coming from outside the space in which the load control system 100 is installed. The radio window sensor 158 may be mounted on a façade of a building, such as the exterior or interior of a window, to measure the exterior natural light intensity depending upon the location of the sun in sky. The radio window sensor 158 may detect when direct sunlight is directly shining into the radio window sensor 158, is reflected onto the radio window sensor 158, or is blocked by external means, such as clouds or a building, and may send digital messages indicating the measured light intensity. The radio window sensor 158 may transmit digital messages including the measured light intensity to the system controller 110 via the RF signals 106. The digital messages may be used to control an electrical load (e.g., the intensity of lighting load 122, the motorized window treatments 140 for controlling the position of the covering material, the intensity of the LED light sources 132, etc.) via one or more control load control devices (e.g., the dimmer switch 120, the electronic drive unit 142, the LED driver 130, etc.). The radio window sensor 158 may also be referred to as a shadow sensor, a cloudy-day sensor, a sun sensor, or another sensor that may measure an external light intensity coming from outside of a space.

The load control system 100 may comprise other types of control-source devices, such as temperature sensors; humidity sensors; radiometers; pressure sensors; smoke detectors; carbon monoxide detectors; air-quality sensors; motion sensors; security sensors; proximity sensors; fixture sensors; partition sensors; keypads; kinetic or solar-powered remote controls; key fobs; cell phones; smart phones; tablets; personal digital assistants; personal computers; laptops; time-clocks; audio-visual controls; safety devices; power monitoring devices (such as power meters, energy meters, utility submeters, utility rate meters); central control transmitters; residential, commercial, or industrial controllers; or any combination of these control-source devices. These control-source devices may transmit digital messages to the system controller 110 via the RF signals 106. The digital messages may be used to control an electrical load (e.g., the intensity of lighting load 122, the motorized window treatments 140 for controlling the position of the covering material, the intensity of the LED light sources 132, etc.) via one or more control load control devices (e.g., the dimmer switch 120, the electronic drive unit 142, the LED driver 130, etc.).

The system controller 110 may be operable to be coupled to a network 170, such as a wireless or wired local area network (LAN) via a network communication bus 162 (e.g., an Ethernet communication link), e.g., for access to the Internet. The system controller 110 may be connected to a network switch 164 (e.g., a router or Ethernet switch) via the network communication bus 162 for allowing the system controller 110 to communicate with other system controllers. The system controller may be configured to communicate via the network 170 with a remote computing device 168 for controlling other electrical loads. The remote computing device 168 may be a network server or other computing device capable of storing instructions or other information for controlling one or more electrical loads in the load control system 100. The system controller 110 may be wirelessly connected to the network 170, e.g., using Wi-Fi technology. The system controller 110 may also be configured to communicate via the network 170 with one or more network devices, such as the network device 166.

The network device 166 may be a smart phone (e.g., an iPhone® smart phone, an Android® smart phone, a Windows® smart phone, or a Blackberry® smart phone), a personal computer, a laptop, a tablet device, (e.g., an iPad® hand-held computing device), a Wi-Fi or wireless-communication-capable television, and/or any other suitable wireless or wired communication device (e.g., an Internet-Protocol-enabled device). The network device 166 may be operable to transmit digital messages to and/or receive digital messages from the system controller 110 and/or the remote computing device 168 in one or more Internet Protocol packets. The network device 166 may communicate via the network communication bus 162 and/or another wired or wireless form of communication (e.g., RF communication signals 106). The network device 166 may be operable to transmit digital messages directly to and/or receive digital messages directly from the load control devices and/or the input devices. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The system controller 110 may be configured to automatically control the load control devices (e.g., the dimmer switch 120, the LED drivers 130, and/or the motorized window treatments 140). For example, the system controller 110 may control the load control devices according to a timeclock schedule, which may be stored in a memory in the system controller 110, and/or based on the sensed daylight intensity that may indicate the amount of daylight in one or more spaces in which the load control system 100 is installed.

Figure 2:
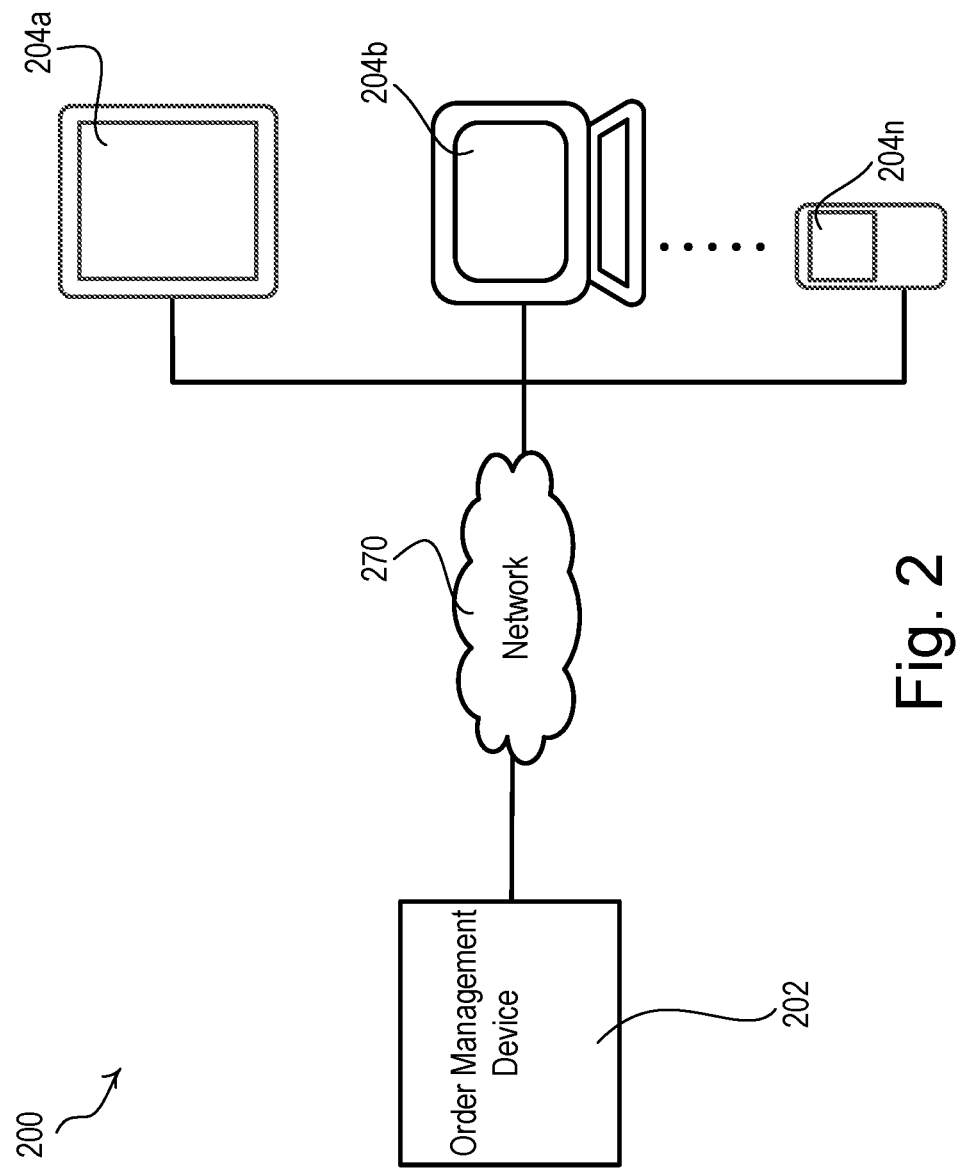
FIG. 2 depicts an example of a control device configuration system.

FIG. 2 is a simplified diagram of a control device configuration system 200. The control device configuration system 200 may be used to configure/design control devices for purchase, including control-source devices and/or control-target devices. For example, the control-source devices may transmit digital messages to the control-target devices, which may control electrical loads in response to the received digital messages.

The control device configuration system 200 may include an order management device 202 and one or more network devices 204a to 204n. The order management device 202 may be a server, a computer, a work station, or other computing device. The network devices 204a to 204n may include a personal computer, a laptop, a tablet, a smart phone, and/or other suitable network communication device (e.g., an Internet-Protocol-enabled device). The order management device 202 and the network devices 204a to 204n may communicate through a network 270.

The order management device 202 and the network devices 204a to 204n may be configured to be wirelessly connected to the network 270, e.g., using Wi-Fi technology to transmit and/or receive RF signals. The network devices 204a to 204n may send and/or receive information from the order management device 202 for processing. The order management device 202 may also, or alternatively, include a web server that enables the network devices 204a to 204n to display information generated at the order management device 202 via an application (e.g., web browser or other local application) for receiving user selections and displaying information via the network devices 204a to 204n. In another example, the network devices 204a to 204n may independently generate user interfaces to display information to a user and receive the user selections for processing.

The order management device 202 may receive and process control device configuration information from the network devices 204a to 204n. The control device configuration information may identify a configuration of control devices being requested in an order for manufacturing or otherwise designing the control device. The control device configuration information may include configuration information for control-source devices and/or control-target devices. The control device configuration information may include configuration data, such as configuration parameters and/or configuration options for valid control devices in the system. The control device configuration information may include configuration data for commercially available control devices and/or control devices under development. The commercially available control devices may include existing control devices and/or control devices that may be created by customized orders.

The network devices 204a to 204n may store the control device configuration information. The network devices 204a to 204n may receive user selections of control device configuration options for different control device configuration parameters. The network devices 204a to 204n and/or the order management device 202 may compare the control device configuration options with the control device configuration information to determine whether the selected control device configuration options are compatible for manufacturing a control device. When the selected control device configuration options are incompatible for a control device, the network device 204a to 204n that received the user selections may identify the incompatibility among the selected control device configuration options. Compatible options may include options that meet a predefined threshold, while in incompatible options may include options that fail to meet the predefined threshold. For example, compatible options may be options that are operable with on another and/or aesthetically pleasing (e.g., same color, pattern, etc.) in combination. Using a window treatment as an example, incompatible options may result in a window treatment having a motor that is not strong enough for the weight of the fabric, such that the speed at which the motorized window treatment operates fails to meet a predefined threshold.

Though certain functionality may be described herein as being performed by a network device 204a to 204n or the order management device 202, similar functionality may be performed on either device or distributed across the devices.

FIGS. 3A-3E depict an example user interface 300 (e.g., a screen, a page, or a window) for being displayed on a network device 302. The user interface 300 may be displayed by a control device configuration application being executed at one or more devices, such as an order management device and/or a network device, having access to control device configuration information. For example, the user interface 300 may be displayed by a lighting control device configuration application or a motorized window treatment application, such as a roller shade configuration application as shown in FIGS. 3A-3E. Though FIGS. 3A-3E show the display of information in a single user interface 300, multiple user interfaces may be implemented to display and/or retrieve similar information.

The user interface 300 may include (e.g., display) configuration parameters 304. The configuration parameters 304 may correspond to adjustable parameters for a type of control device, such as a lighting control device or a motorized window treatment. For example, the configuration parameters 304 may include size, mounting type, fabric type, top treatment, control type, an operator type (e.g., type of manual operation or drive type for motorized operation), bracket type, hembar configuration, fabric drip, railroading options, seam options, single angle options, side channel options, light gap options, a coupler type, and/or other options for a motorized window treatment. Though the configuration parameters 304 shown in FIGS. 3A-3E correspond to a motorized window treatment, other configuration parameters may be displayed for other types of control devices.

The configuration parameters 304 may be defined by selections of corresponding configuration options. For example, the size parameter 312, the mounting parameter 314, and the fabric type parameter 316 may be defined by the selections of respective configuration options 306, 308, and 320. The configuration parameters 304 may be parameters of control devices identified in the control device configuration information. Available configuration options for each configuration parameter 304 may include the options for configuring the control devices in the control device configuration information. For example, the available configuration options 306 for the size parameter 312 may be based on the available sizes of the control devices in the control device configuration information. As the configuration parameters 304 are defined by corresponding configuration options, the configuration options may be added to filtering criterion for generating a filtered result set from the control device configuration information.

Figure 3A:
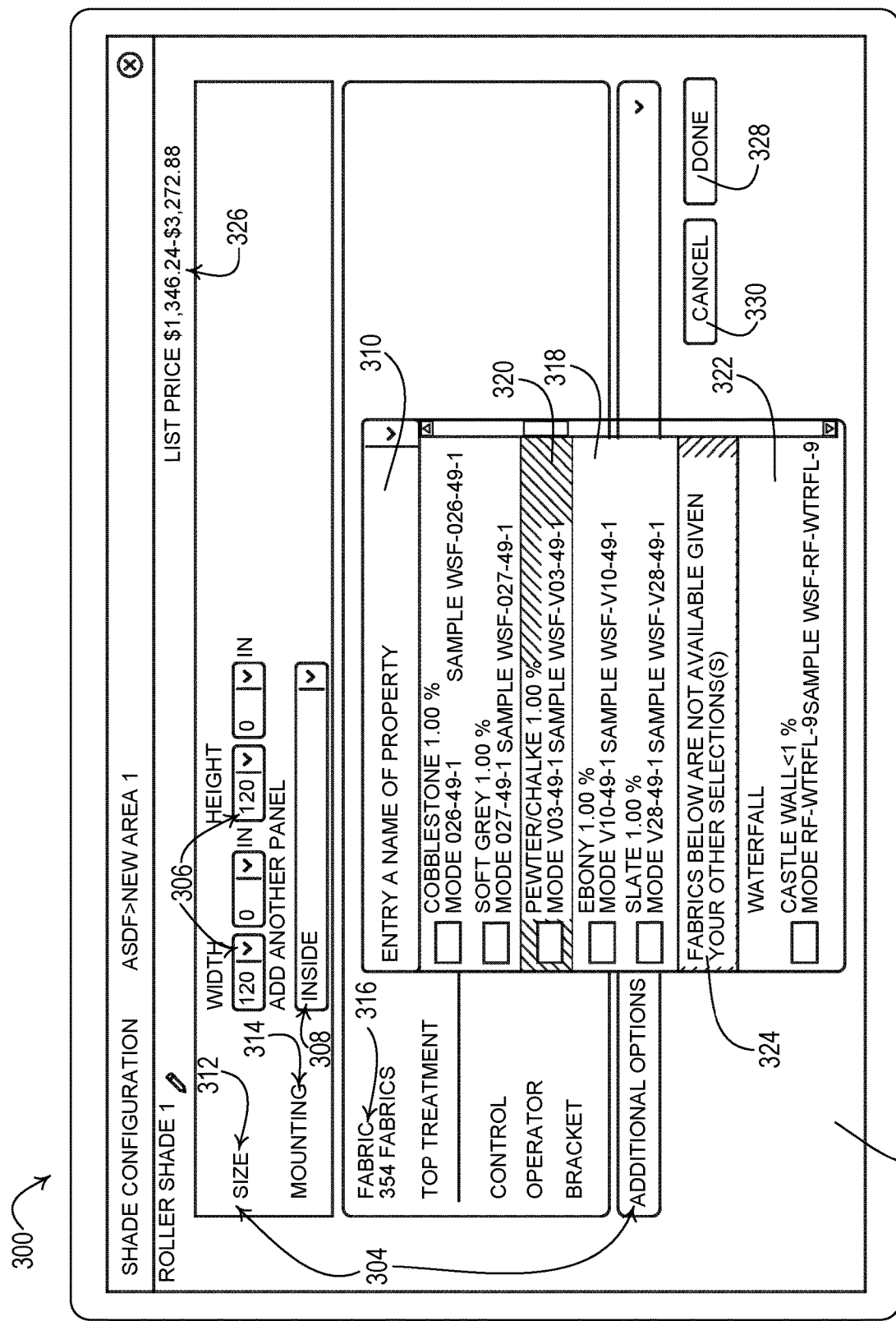
FIGS. 3A-3E depict an example user interface for being displayed on a network device.

The user may select the configuration option 306 to define the size parameter 312. The user may select the configuration option 308 to define the mounting parameter 314. The user may select the configuration option 320 to define the fabric type parameter 316. As shown in FIG. 3A, the user may select the configuration option 320 from a list (e.g., a pull-down window) of configuration options 310 to define the fabric type parameter 316.

The configuration options 310 may include configuration options that are identified as being compatible with and/or incompatible with the previously selected configuration options 306, 308. For example, the configuration options 310 may include compatible configuration options 318 and/or incompatible configuration options 322. The compatible configuration options 318 for the fabric type parameter 316 may include fabric types that are compatible with prior user selections of configuration options for other configuration parameters 304. For example, the user interface 302 may identify compatible configuration options 318 that are compatible with the previously selected configuration options 306, 308. The incompatible configuration options 322 for the fabric type parameter 316 may include fabric types that are incompatible with the prior user selections of configuration options for other configuration parameters 304. For example, the user interface 302 may identify the incompatible configuration options 322 that are incompatible with the previously selected configuration options 306, 308.

The display of configuration options 310 may include an indication 324 that distinguishes the compatible configuration options 318 from the incompatible configuration options 322. The indication 324 may be in various forms such as a dividing line or a message pointing out the incompatible configuration options 322. The indication 324 may inform the user which part of the display of the configuration options 310 includes compatible configuration options 318, and which part of the display of the configuration options 310 includes incompatible configuration options 322. The indication 324 may move within the display of the configuration options 310, such as within a drop-down menu. For example, the indication 324 may be shown while configuration options 310 are displayed and/or while incompatible configuration options 322 are displayed within the drop-down menu. The user interface 302 may identify a user-selected configuration option 320. The configuration option 320 may be added to the filtering criterion for generating the filtered result set from the control device configuration information from which the configuration options may be displayed.

As the user defines configuration parameters 304, the user interface 302 may update price information 326 corresponding to the control devices having the selected configuration options for the defined configuration parameters 304. As shown, the price information 326 may be a range that may be determined based on the configuration parameters that a user has defined and based on compatible options of all remaining parameters yet to be defined that may result in valid control devices. As a user continues to select additional options for other parameters, the price information 326 may automatically update, such as in real time. In this fashion, a user is able to determine as the user defines a control device whether the selected options are resulting in a product within a desired price range. When the user selects order button 328, a filtered result set may be generated in an order that identifies the control devices in the control device configuration information that include the configuration options for the defined configuration parameters 304. When the user selects cancel button 330, the configuration options for the configuration parameters 304 may be reset.

Figure 3B:
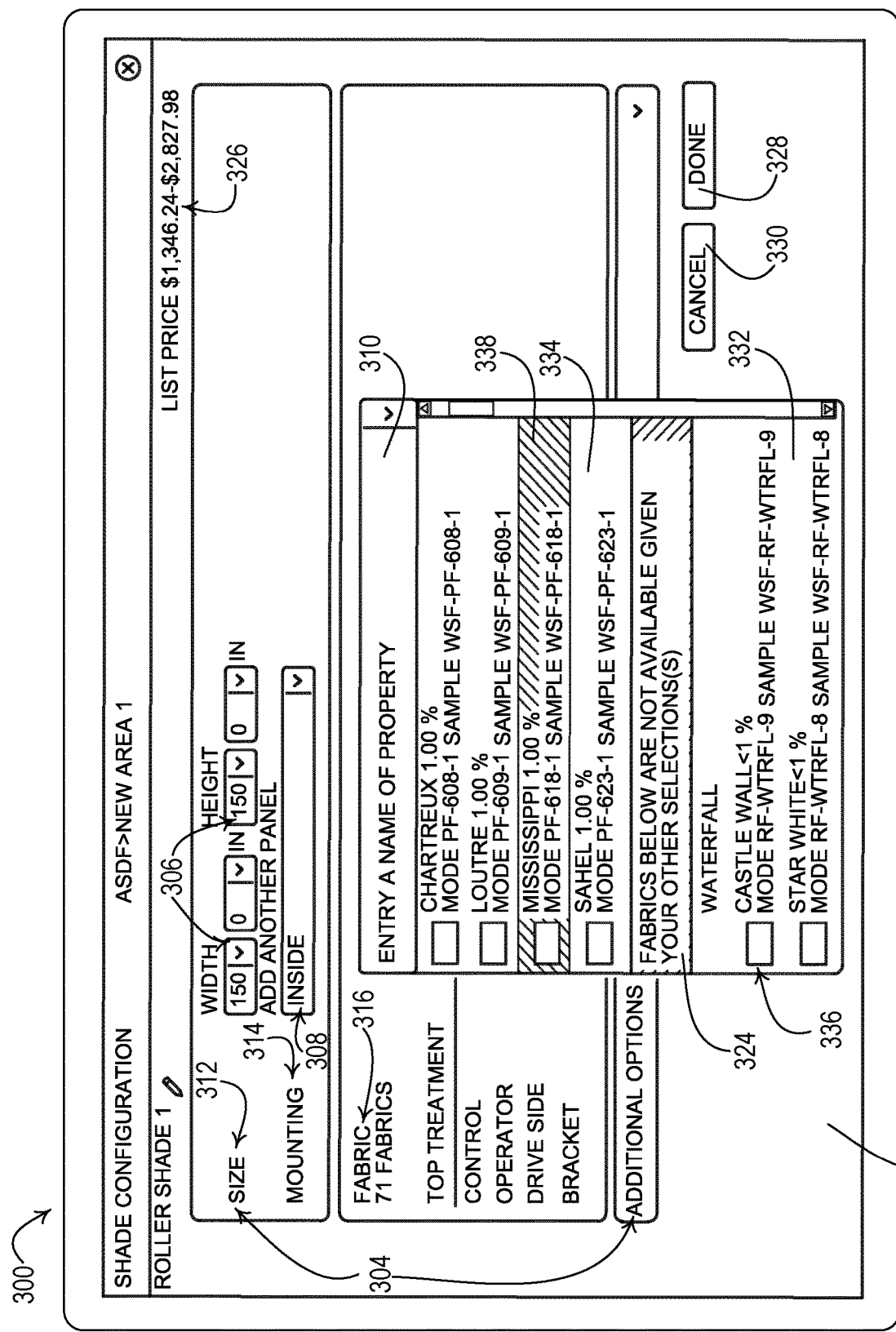

As shown in FIG. 3B, the user may change the configuration options defined for the configuration parameters 304. The filtered result set may be dynamically updated based on changes to the configuration options for the corresponding configuration parameters 304. For example, FIG. 3B shows a change to the configuration option 306 for the size parameter 312. As the configuration parameters are redefined by corresponding configuration options, the configuration options may be added to the filtering criterion to update the filtered result set from the control device configuration information.

The filtering criterion and the filtered result set may be further updated as additional configuration parameters are further defined by compatible configuration options. For example, after the user changes the configuration option 306 for the size parameter 312, the price information 326 may update. In addition, the compatible configuration options and the incompatible configuration options for the other configuration parameters 304 may be dynamically updated. The dynamic update of the configuration options 310 may be performed by identifying compatible configuration options 334 and/or incompatible configuration options 332 for the control devices in a filtered result set of control devices based on the changed configuration option 306 for the size parameter 312. The user may continue to select configuration options for the configuration parameters 304, and the configuration options 310 may continue to be updated based on the user selections. The configuration options 310 for the fabric parameter 316 may be dynamically updated to include the compatible configuration options 334 and/or the incompatible configuration options 332. As shown in FIG. 3B, the user may select a configuration option 338 among the compatible configuration options 334. The configuration option 338 may be added to the filtering criterion to further update the filtered result set from the control device configuration information. The configuration options for the other configuration parameters 304 that are available for selection by the user may be further updated based on the selected configuration option 338 for the fabric parameter 316. Though the configuration options 310 for the fabric parameter 316 are shown as an example, the configuration options for other parameters, such as the control type parameter, the operator type parameter, etc., may be similarly updated.

Certain configuration parameters may be given priority, such that the configuration parameters are to be defined by user selection before automatically selecting the configuration options for other configuration parameters. For example, the size, fabric type, control type, and/or operator type may be given priority, such that a user may select a configuration option for the parameter(s) given priority before automatically defining the other configuration parameters. After defining the configuration parameters having priority, a default configuration option may be automatically selected for the other configuration parameters based upon price and/or popularity. As an example, a default configuration option may be automatically selected for the additional configuration parameters 305 (e.g., identified under "additional options" in FIGS. 3D and 3E) after the configuration parameters with priority have been defined. The automatically selected configuration option for each configuration parameter may be the option having the lowest price, the most popular option from previous selections by the user or other users, or a combination of price and popularity.

The price range 326 updates as the user's selection of configuration options for the control devices changes. The price range 326 may begin updated after the selection of one or more configuration options. For example, the price range 326 may be displayed after the size parameter 312 is defined. The control device configuration information may include corresponding price data for each control device. The control device configuration information may be filtered based on the selected configuration options for the configuration parameters, and a price range 326 corresponding to the control devices having the compatible configuration options may be displayed.

A maximum price may be a configuration parameter that is defined on the user interface 302 and may be stored as a filtering criteria. The price range 326 may be limited to the maximum price. The configuration options for control devices that would cause the price range 326 to exceed the maximum price may be filtered out as incompatible configuration options for a given parameter. The incompatible option may be selected and the user may be notified to change the maximum price and/or a maximum price may be suggested to allow the selection of the incompatible option.

The indication 324 may distinguish the compatible configuration options 334 from the incompatible configuration options 332. As shown in an example in FIG. 3C, the indication 324 may be displayed in different positions within the configuration options 310 to indicate the incompatible configuration options 332. The indication 324 may move within the pull-down window as different selections are made on other parameters and/or as a user may scroll up/down the pull-down window containing configuration options 310. For example, as the user scrolls down, the pull-down window may show a list of incompatible configuration options 332. The indication 324 may stay at the top of the pull-down window to indicate that the configuration options 310 being displayed are incompatible configuration options 332. Though not shown in FIG. 3C, as the user scrolls up, the pull-down window may show the compatible configuration options 334. The indication 324 may stay at the bottom of the pull-down window to indicate that each configuration option seen is a compatible configuration option. In another example, the indication 324 may disappear when the next configuration option 310 below those being displayed is a compatible configuration option 334 and/or appear when the next configuration option 310 below those being displayed is an incompatible configuration option 332 to indicate the next type of configuration option 310.

Figure 3C:
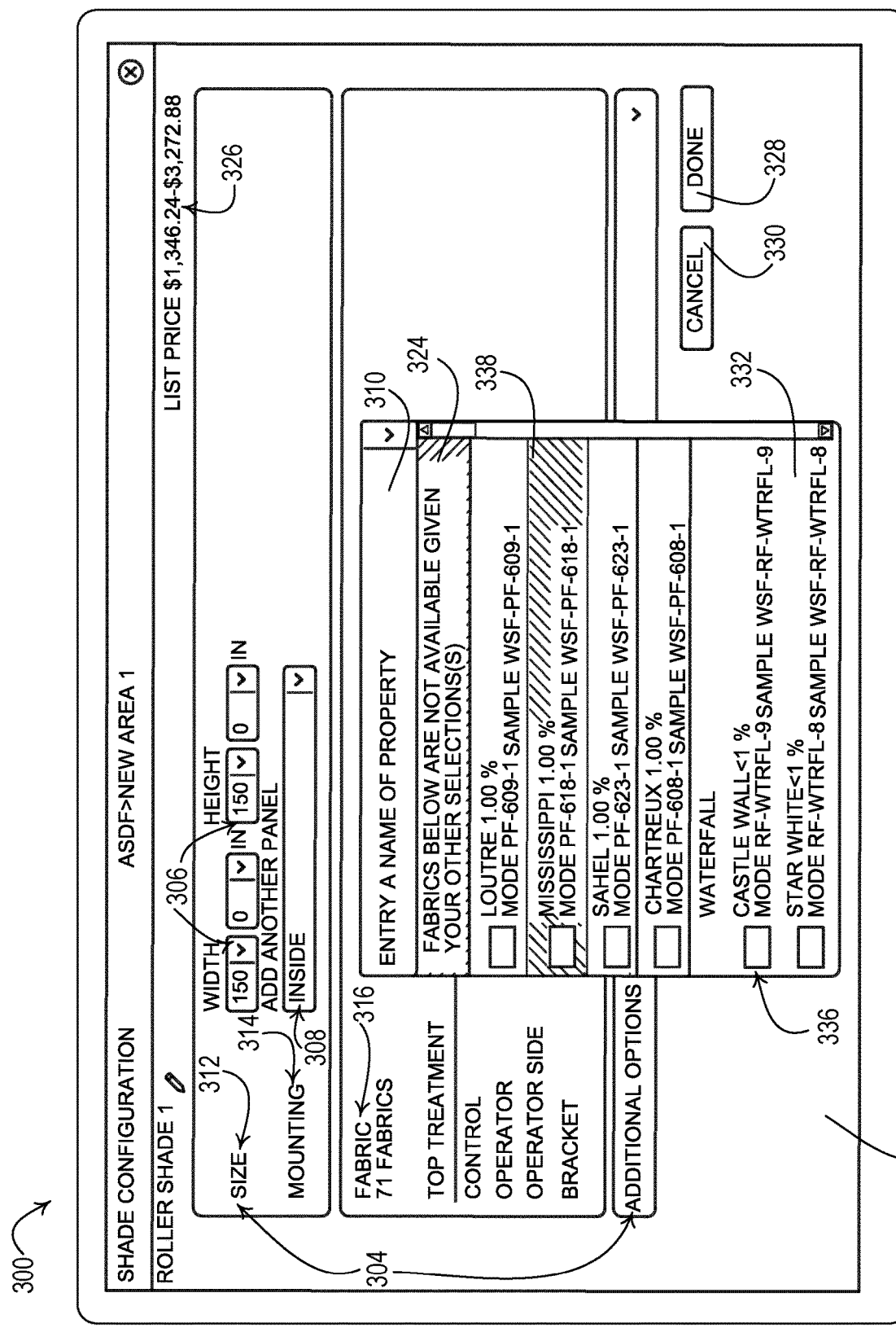
Figure 3D:
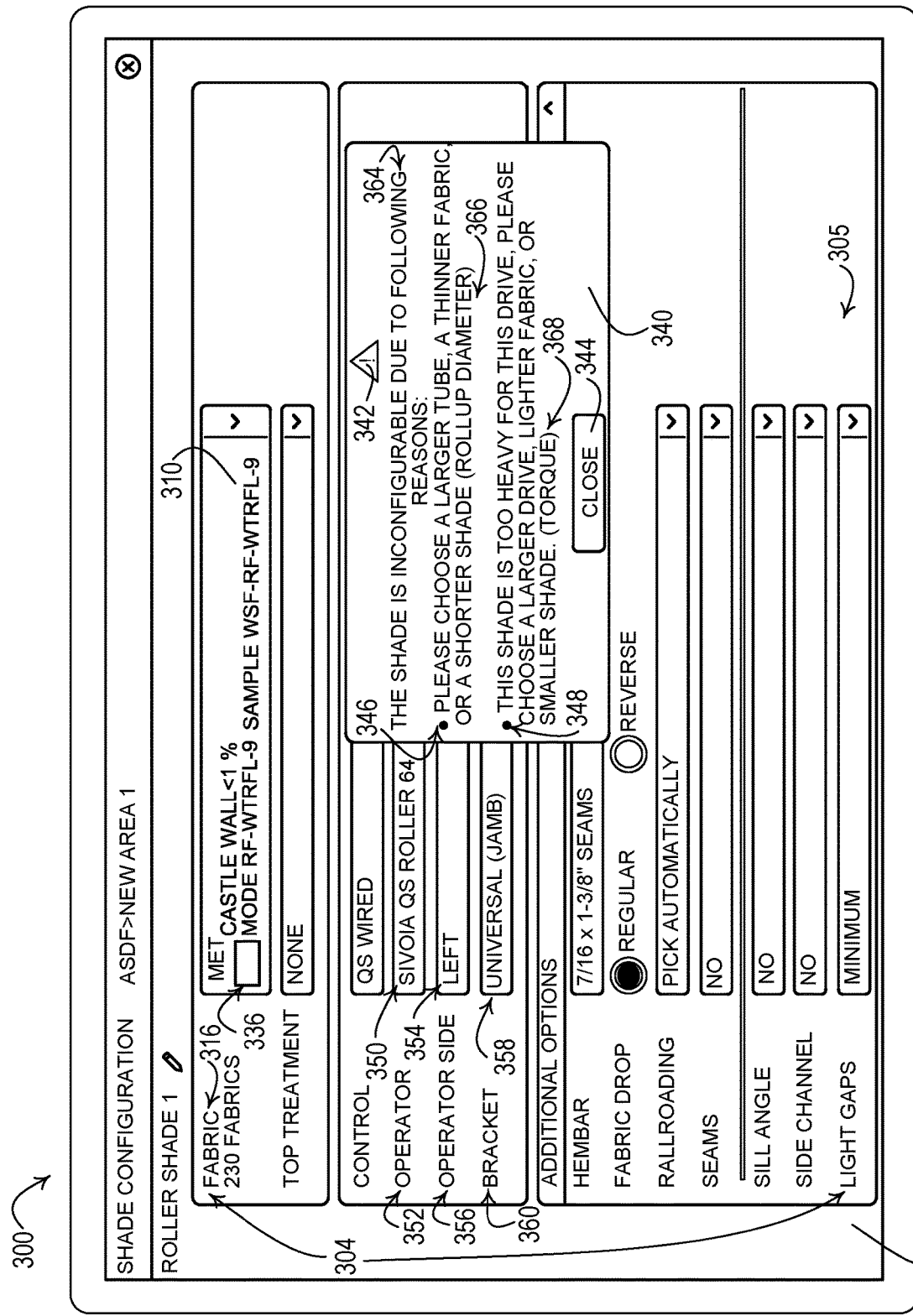

As shown in FIG. 3D, an alert 340 may be displayed when a configuration parameter 304 is defined by a corresponding selected configuration option that is incompatible with prior user selections of configuration options for other configuration parameters 304 for configuring a control device. The user interface 300 and/or the control device configuration application generating the user interface 300 may enter an invalid state. For example, the invalid state may include displaying the alert message and possibly setting the price range 326 to a null value. In addition, or alternatively, one or more of the previously selected configuration parameters 304 and/or the price range 326 may be set to a null value in the invalid state. The price range 326 may not be shown, as in FIG. 3D. The entry of the invalid state may assist the user in selecting compatible configuration options for defining a valid control device. As such, the user may intentionally select an incompatible option to be alerted to options to be changed elsewhere to make the selected option a valid option.

The user interface 300 may go back to a valid state, for example when the alert 340 is closed or when a configuration parameter 304 is defined by a corresponding configuration option that is compatible with prior user selections of configuration options for other configuration parameters 304 for configuring a control device. When the alert 340 is closed, the selected incompatible option may not be accepted as a valid user selection and may be an invalid user selection.

The alert 340 may be displayed in various forms. For example, the alert 340 may be an error message. The alert 340 may indicate that the user selection of the incompatible configuration option is not available in the control device configuration information. The alert 340 may identify one or more of the previously defined configuration parameters 304 that are incompatible with the received configuration option. The alert 340 may recommend how to change the previously defined configuration parameters to make them compatible with the received configuration option. The alert 340 may provide the user with an option to proceed with the received incompatible configuration option or may allow the user to close the alert with the system not accepting the received incompatible configuration option (e.g., leaving it undefined).

Upon receiving the alert 340, a user may decide to replace the incompatible configuration option with a configuration option that is compatible with the previously selected configuration options for other configuration parameters 304. If the user replaces the incompatible configuration option with a configuration option that is compatible with the previously selected configuration options for other configuration parameters 304, the compatible configuration option may be added to the filtering criterion. If the user retains the incompatible configuration option, the previously selected configuration options may be reevaluated for compatibility with the retained configuration option. The compatibility of each previously selected configuration option in the filtering criterion may be evaluated in order to determine whether to maintain the previously selected configuration option in the filtering criterion. After a reevaluation of the previously selected configuration options, the previously selected configuration options that are incompatible with the retained configuration option may be set to a default value, which may be a null value or a default option that is compatible with the retained configuration option. The filtering criterion may be rebuilt based on the decision to include the retained configuration option.

The user may select the configuration option 310 to define the fabric type parameter 316. For example, the user may select the incompatible configuration option 336 as shown in FIG. 3C and FIG. 3D. When the user defines the fabric type parameter 316 by selecting an incompatible configuration option 336, the user interface 300 may display an alert 340, as shown in FIG. 3D. The alert 340 may include a warning symbol 342, and/or a message 364 that a motorized window treatment is inconfigurable for example. The alert 340 may identify reasons 346 and 348 that the selection of the configuration option 336 is incompatible with previously selected configuration options for other configuration parameters, such as configuration parameter 366 and configuration parameter 368, respectively, to fix the incompatibility. The reasons 346 and 348 may identify the previously defined other configuration parameters 366 and 368, respectively, as incompatible with the selected configuration option 336. According to one example, the alert 340 may include a close button as an option that closes the alert but does not retain the received incompatible configuration option 336. Here, the system may set the parameter to a null value or to a valid option. In this fashion, a user is at least able to determine what the user may need to change elsewhere for other parameters if the user desires to select the incompatible configuration option 336.

According to another example, the alert 340 may include a close button 344 as an option to retain the received, incompatible configuration option 336. If the user closes the alert 340, the configuration parameters 366 and/or 368 may be redefined to a default value. If the user retains the incompatible configuration option 336, the filtering criterion may be adjusted to include the configuration option 336 and remove the previously selected configuration options for other configuration parameters 304 that are incompatible with the configuration option 336. For example, the filtering criterion may be adjusted while the user interface 300 and/or the control device configuration application generating the user interface 300 is in an invalid state. The filtering criterion may be rebuilt based on the decision to retain the incompatible configuration options 336.

The compatibility of each previously selected configuration option in the filtering criterion may be dynamically re-evaluated. For example, as shown in FIG. 3D, the adjustment may include re-evaluating a previously selected configuration option 350 for configuration parameter 352 and determining that the selected configuration option 350 is an incompatible configuration option with the retained configuration option 336. The adjustment may include removing the previously selected configuration option 350 for the configuration parameter 352 from the filtering criterion. A configuration option 354 for a configuration parameter 356 and a configuration option 358 for a configuration parameter 360 may be re-evaluated and may be maintained in the filtering criterion as being compatible with the retained configuration option 336. A user may close the alert 340 by selecting a close button 344.

Figure 3E:
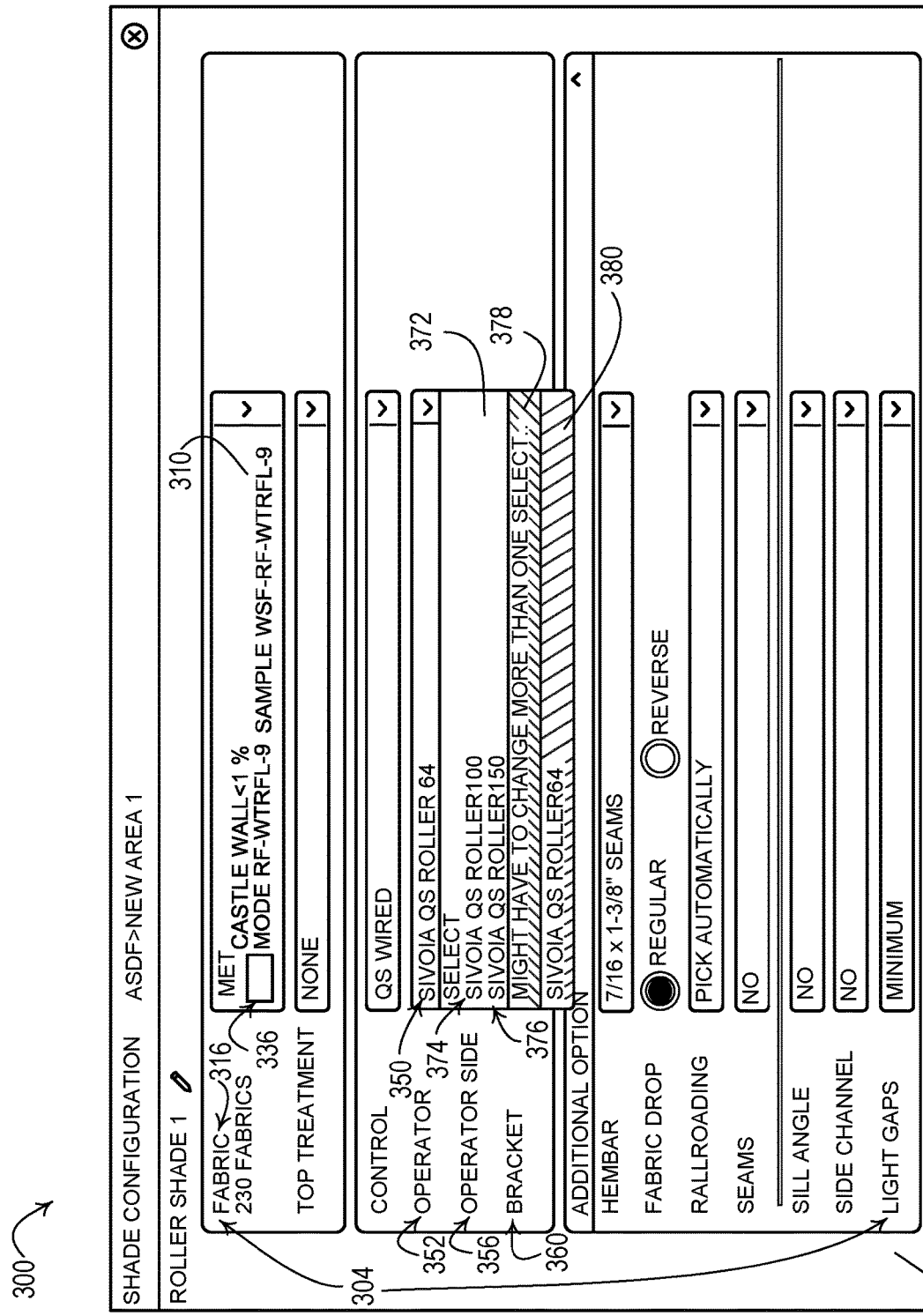

As shown in FIG. 3E, the incompatible configuration option 336 may be retained. The configuration parameters 304 may be updated to display configuration options that are compatible with the retained configuration option 336 and configuration options that are incompatible with the retained configuration option 336. For example, the user may be informed by the alert 340 that the previously selected configuration option 350 for configuration parameter 352 as an incompatible configuration option with the retained configuration option 336. The user may change the previously selected configuration option 350 for configuration parameter 352. In a pulldown menu 372, the previously selected configuration option 350 may be identified, at 380, as an incompatible configuration option with the retained configuration option 336. The pulldown menu 372 may identify compatible and incompatible configuration options with the currently selected configuration options. Configuration options 374 and 376 may be identified as compatible configuration options with the retained configuration option 336. The user may replace the previously selected configuration option 350 with either of the compatible configuration options 374 or 376. A banner 378 may show that additional configuration parameters 304 may need to be changed. For example, replacing the previously selected configuration option 350 with either configuration option 374 or configuration option 376 may not switch the user interface 300/or the control device configuration application generating the user interface 300 from an invalid state to a valid state.

The filtering criterion may be adjusted to include the configuration option 336 when the alert 340 is closed. The previously selected configuration options for other configuration parameters 304 that are incompatible with the configuration option 336 may be removed. The filtering criterion may be rebuilt based on the decision to retain the incompatible configuration options 336. For example, a user selection of the configuration option 374 or 376 may be included in the filtering criterion.

The compatibility of each previously selected configuration option in the filtering criterion may be dynamically re-evaluated. For example, as shown in FIG. 3D, the adjustment may include identifying a previously selected configuration option 350 for configuration parameter 352 as an incompatible configuration option with the retained configuration option 336. The adjustment may include removing the previously selected configuration option 350 for the configuration parameter 352 from the filtering criterion. For example, a configuration option 354 for a configuration parameter 356 and a configuration option 358 for a configuration parameter 360 may be re-evaluated in order to determine whether to maintain the configuration option 354 and the configuration option 358 in the filtering criterion.

Figure 4:
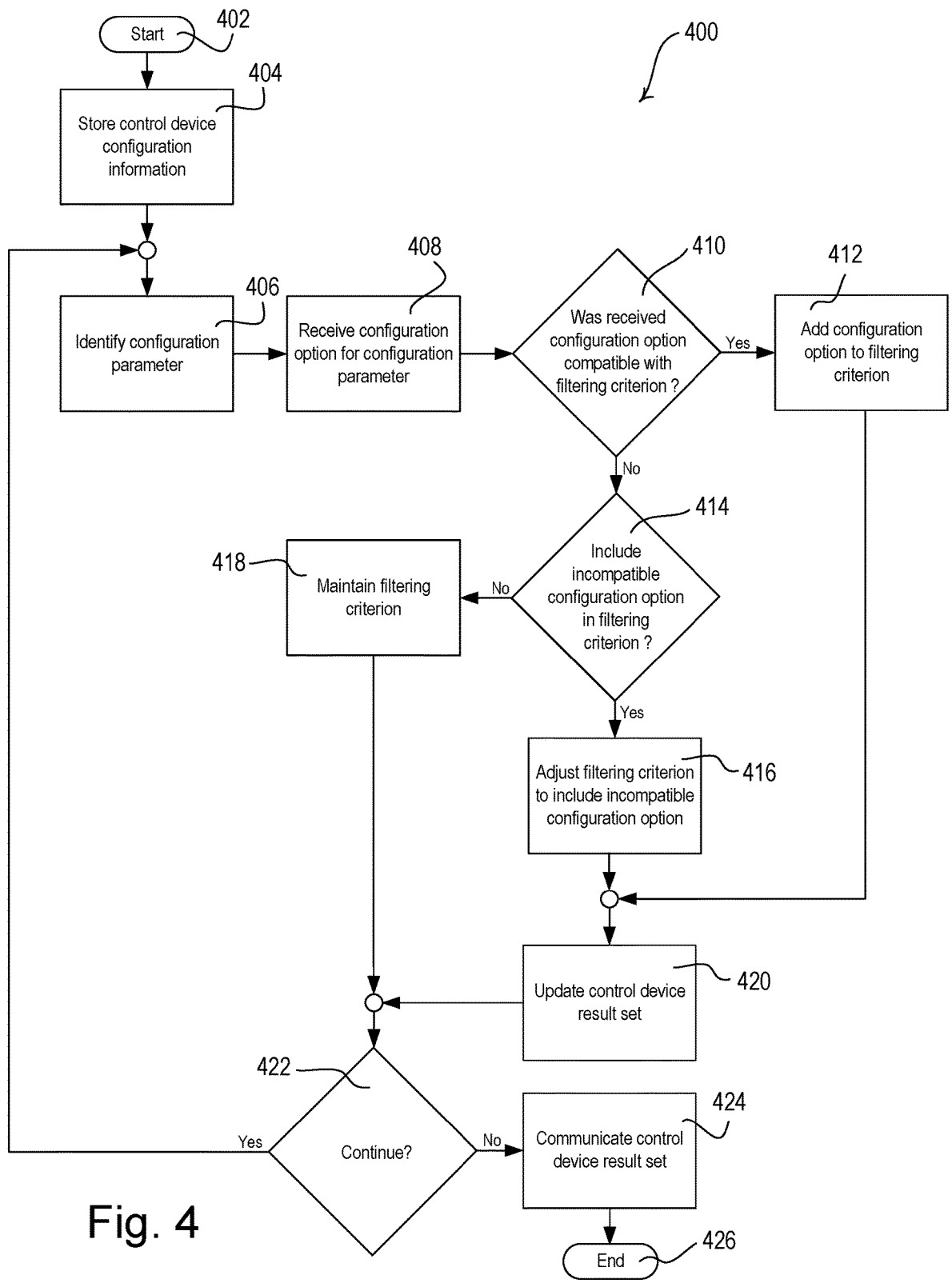
FIG. 4 is a flow diagram illustrating an example method of operating a control device configuration system.

FIG. 4 is a flow diagram illustrating an example method 400 of operating a control device configuration system, such as the control device configuration system 200 shown in FIG. 2. One or more portions of the method 400 may be performed by a network device, such as the network devices 204a to 204n shown in FIG. 2, and/or an order management device, such as the order management device 202. One or more portions of the method 400 may be performed by a control device configuration application being executed on a single device, or distributed across multiple devices.

As shown in FIG. 4, the method 400 may start at 402. At 404, control device configuration information may be stored.

The control device configuration information may include valid device configurations for control devices. The control device configuration information may identify control device configuration parameters and options corresponding to different control devices. The control device configuration information may include corresponding price data for each control device. The control device configuration information, or portions thereof, may be stored at the order management device and/or the network devices.

A configuration parameter may be identified at 406. For example, a user may select a configuration parameter for which a configuration option may be selected. The configuration parameter may include parameters that may be configured for a control device stored in the control device configuration information, such as a size of a motorized window treatment, a color of a covering material for a motorized window treatment, etc. A configuration option may be received for the identified configuration parameter at 408. The configuration option may be selected by a user from a list of available configuration options for the identified configuration parameter. The configuration option may include a defined size of the motorized window treatment, a defined color of the covering material for the motorized window treatment, etc. The configuration option may be for the identified configuration parameter of the control device stored in the control device configuration information.

At 410, a determination may be made as to whether the received configuration option is compatible with previously selected filtering criterion. If no filtering criterion were previously selected, then the received configuration option may be determined to be a compatible configuration option. The filtering criterion may include previously selected configuration options that are compatible for one or more control devices stored in the control device configuration information at 404. If the received configuration option for the identified configuration parameter in combination with previously selected configuration options for other configuration parameters yields at least one result from the control device configuration information stored at 404, the received configuration option may be compatible with the previously selected filtering criterion. If the received configuration option is compatible with the previously selected filtering criterion, the received configuration option may be added to the filtering criterion at 412.

If the received configuration option is incompatible with the previously selected filtering criterion at 412, a determination may be made as to whether to include the received incompatible configuration option in the filtering criterion at 414. A user may be prompted to select whether to continue to filter the control device configuration information stored at 404 based on the received incompatible configuration option. For example, the currently received incompatible configuration option may be of greater importance to the user for selecting a control device than the previously selected configuration options, so the user may wish to continue to filter the control device configuration information stored at 404 based on the received incompatible configuration option.

If the received incompatible configuration option is determined at 414 to be included in the filtering criterion, the filtering criterion may be adjusted at 416 to include the configuration option. The adjustment at 416 may include identifying one or more of the previously selected filtering criterion that is incompatible with the received configuration option and removing the previously selected incompatible filtering criterion. The filtering criterion may be rebuilt at 416 based on the decision to include the received incompatible configuration option at 414. The filtering criterion may be maintained at 418 based on the decision to not include the received incompatible configuration option at 414.

The compatibility of each previously selected configuration option in the filtering criterion may be evaluated in order to determine whether to maintain the previously selected configuration option in the filtering criterion. The previously selected configuration option may be evaluated according to a priority assigned to the configuration parameter for which the previously selected configuration option exists in the filtering criterion. For example, the configuration parameter for the configuration option received at 408 may be given higher priority than the other configuration parameters for which configuration options have been added to the filtering criterion. The other configuration parameters in the filtering criterion may be further prioritized to determine whether the configurations options in the filtering criterion are incompatible with the updated filtering criterion. For example, the size of a motorized window treatment may be given a priority over a color of a covering material and maintained in the filtering criterion. The priority for each configuration parameter may be predefined and/or user defined. The priority for each configuration parameter may be defined by the order in which it was identified by the user. The largest dataset of compatible configuration options in the filtering criterion that include the received incompatible configuration option may be identified and maintained. The previously selected incompatible configuration options may be identified to the user.

At 420, a control device result set may be updated based on the filtering criterion defined at 412 and/or 416. The control device result set may be a filtered device result set that includes the defined configuration parameters within the filtering criterion. The filtering criterion may be applied to the control device configuration information to identify a set of control devices that include the defined configuration parameters including the selected configuration options. The load control device result set may also identify prices and/or a price range of the control devices within the result set.

At 422, a determination may be made as to whether to continue to define configuration parameters. If a determination is made, at 422, to continue to define configuration parameters, the method 400 may return to 406 to identify additional configuration parameters for being defined and upon which the filtering criterion may be built. If a determination is made, at 422, to discontinue defining configuration parameters, the method 400 may proceed to 426 to communicate the control device result set. The control device result set may be communicated by being displayed on a network device. The control device result set may be communicated from the network device to the order management device for processing. The method 400 may end at 426.

Figure 5:
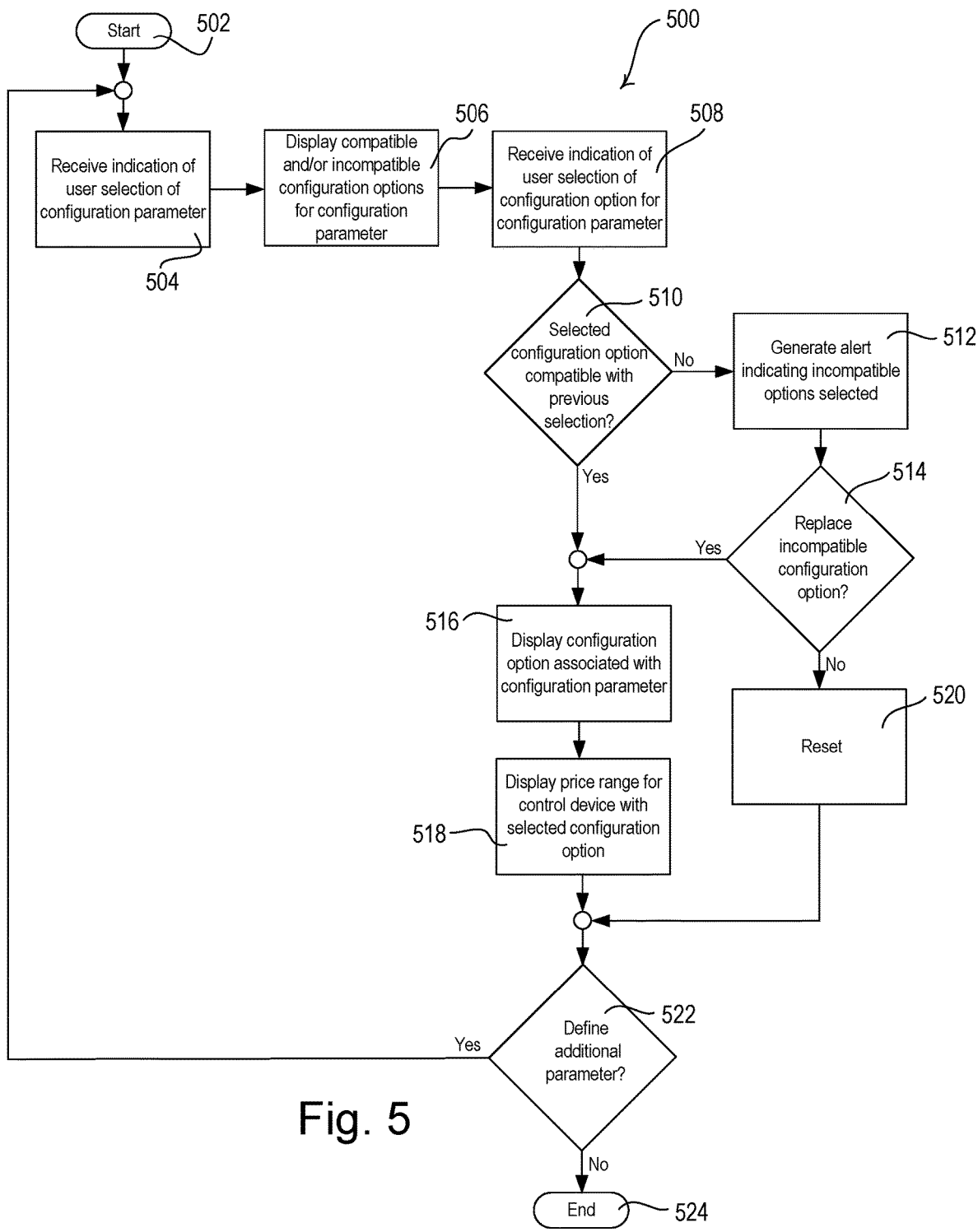
FIG. 5 is another flow diagram illustrating an example method of operating a control device configuration system.

FIG. 5 is a flow diagram illustrating an example method 500 of operating a control device configuration system, such as the control device configuration system 200 shown in FIG. 2. One or more portions of the method 500 may be performed by a network device, such as the network devices 204*a* to 204*n* shown in FIG. 2, and/or an order management device, such as the order management device 202 shown in FIG. 2. One or more portions of the method 500 may be performed by a control device configuration application being executed on a single device, or distributed across multiple devices.

As shown in FIG. 5, the method 500 may begin at 502. At 504, an indication may be received of a user selection of a configuration parameter of a control device, such as a motorized window treatment. Configuration options for the indicated configuration parameter may be displayed at 506. The configuration options may include compatible and/or incompatible configuration options based on prior user selections of configuration options for other configuration parameters for configuring a control device. The configuration options may be displayed at 506 by identifying the compatible configuration options and/or the incompatible configuration options for the control device in a filtered result set of control devices.

At 508, an indication of a user selection of a configuration option associated with the chosen configuration parameter may be received. The control device configuration system may determine, at 510, whether the selected configuration option is incompatible with previously selected configuration options for other configuration parameters of the control device. For example, a selected size of a motorized window treatment may be compared with previously selected color, fabric type, and other configuration options to determine whether the selected size is compatible with the previously selected color, fabric type, and other configuration options. If the selected configuration option is compatible with the previously selected configuration options for other configuration parameters, the method 500 may display the selected configuration option for the configuration parameter at 516.

If the selected configuration option is incompatible with the previously selected configuration options for other configuration parameters, the method 500 may generate an alert at 512. The alert may indicate that selected configuration options are incompatible. The alert may identify the previously selected configuration options and/or configuration parameters that are incompatible with the selected configuration option. A table may be maintained to connect the alert with a list of the previously selected configuration options and/or configuration parameters that are incompatible with the selected configuration option. The alert may identify configuration options for the previously defined configuration parameters and/or configuration options alternative to the selected configuration option that may be adopted to fix the incompatibility. For example, the alert may indicate that a previously selected size of a motorized window treatment is incompatible with a selected fabric type. The alert may indicate that a smaller size of a motorized window treatment may be compatible with the selected fabric type and should be adopted to fix the incompatibility. The alert may be provided to help guide the user to compatible configuration options during the selection of configuration options for control devices.

At 514, a determination may be made as to whether to replace the incompatible configuration option for the configuration parameter with a configuration option that is compatible with the previously selected configuration options for other configuration parameters. If a determination is made to replace the incompatible configuration option with a configuration option that is compatible with the previously selected configuration options for other configuration parameters, the method 500 may proceed to 516. Configuration options may be displayed for the configuration parameter at 516. For example, when the selected fabric type of the motorized window treatment is incompatible with the selected size of the motorized window treatment, the user may close the alert and may select a fabric type that is compatible with the selected size. The control device configuration information may be filtered based on the selected configuration option. A price range corresponding to the control devices having the compatible configuration options may be displayed at 518.

If the determination is made to retain the incompatible configuration option, the method 500 may proceed to 520. For example, the user may wish to continue to filter control device configuration information using the configuration option that is incompatible with the previously selected configuration options. If the incompatible configuration option is given a higher priority and the user wishes to continue with the incompatible configuration option, the previously selected configuration options may be reevaluated for compatibility with the selected, incompatible configuration option. For example, when the user closes the alert generated at 512 and retains the incompatible configuration option, the incompatible configuration option may be given a higher priority, such that the previously selected configuration options that are incompatible with the retained configuration option may be identified. After a reevaluation of the previously selected configuration options, the resulting incompatible configuration options may be set to a default value at 520, which may be a null value or a default option that is compatible with the retained configuration option.

At 522, a determination may be made as to whether more parameters are to be defined, such as by selecting a corresponding configuration option. If additional parameters are to be defined, the method 500 may return to 504 to receive another indication of a user selection of a configuration parameter to be defined. If no more parameters are to be defined with corresponding configuration options, the method 500 may end at 524. For example, the user may select a search button or provide another indication to perform a filtered search of control devices based on the defined configuration parameters.

Configuration models may be implemented by the control device configuration application to increase the efficiency of searching through the control device configuration information to identify compatible and incompatible configurations options in the control device configuration information from the filtering criterion. Searching through the control device configuration information having a number of different sets of options to compare for a number of different parameters to identify compatible and incompatible options for a result set may be an inefficient use of processing resources and power at the device or devices performing such processing.

Each type of control device may have a corresponding configuration model that may be implemented to increase processing efficiency. For example, each roller shade that may be configurable in the system may have a corresponding configuration model defined therefore. A configuration model may comprise a set of control device configuration parameters for a given type of control device (e.g., shade, lighting device, etc.). FIG. 6 illustrates example parameter definitions of configuration parameters for a roller shade that may be updated according to a configuration model. As shown in FIG. 6, the configuration parameters may include a size parameter 602 (e.g., width and/or height), a mounting parameter 604, a fabric type parameter 606, a control type parameter 608, an operator type parameter 610, and/or other types of parameters for being defined for a configurable roller shade. Each configuration model may have a configuration parameter definition for each configuration parameter that includes a name/identifier 620 of the control device configuration parameter, a set of available configuration options 622 for the configuration parameter (e.g., a range of values, a list of options, a list of ranges, etc.), one or more group identifier(s) 624, a selected option 626 (from the set of options 622) selected by a user for the configuration parameter, and/or valid configuration options 628.

The name/identifier 620, the set of options 622, and/or the group identifiers 624 may be predefined prior to runtime and may be static values during runtime. The control device configuration application may use the name/identifier 620 of each configuration parameter and the corresponding set of options 622 to populate the display. For example, as shown in FIGS. 3A-3C, the control device configuration application may use the name/identifier 620 to display the different configuration parameters 304 and the corresponding set of options 622 to display the configuration options 310.

To enable faster processing and display of results in response to user selections, each configuration parameter may be assigned to one or more configuration parameter groups identified by group identifiers 624. A configuration parameter group may be a set of two or more configuration parameters that may impact each other in response to selection of corresponding configuration options. For example, the compatible configuration options for one parameter in the configuration parameter group may be affected by the selection of a configuration option corresponding to another configuration parameter in that group. As shown in FIG. 6, the size parameter 602 (e.g., height and/or width) and the fabric type parameter 606 may be part of the same group, as the selected size may impact the types of available fabric for that size, and vice versa. The operator type 610 may be in the same group as the size 602, as the size of the roller shade may affect the size of the drive needed to control the roller shade. A given configuration parameter may belong to multiple groups. Each group may be pre-defined prior to runtime based on the relationship between each parameter.

The selected option 626 for the configuration parameter and/or the valid options 628 may be defined during runtime of the control device configuration application from the control device configuration information. The selected options 626 may define the filtering criteria by which valid control devices are filtered in the control device configuration information. For example, as shown in FIG. 3A, the control device configuration application may receive a user selection of the configuration option 306 and 308. The configuration options 310 for the fabric type parameter 316 may be dynamically updated to include configuration options that are identified as being compatible with and/or incompatible with the previously selected configuration options 306, 308. The valid configuration options 628 may be updated in response to the user selections to identify the configuration options that are part of valid devices having the user selected options. The compatible configuration options 318 and/or incompatible configuration options 322 may be determined from the valid options 628 and displayed to the user.

The valid configuration options 628 may continue to be updated in response to selected options by a user. After a user selection of a configuration option for a given parameter, the valid configuration options 628 may be analyzed and/or updated for each parameter in the same group(s) as the parameter of the selected configuration option. Limiting the processing for determining the configuration options 628 by group may enable faster processing and use of less resources (e.g., memory, power, etc.). The valid configuration options 628 may be analyzed for multiple parameters in parallel to increase efficiency.

One or more of the configuration parameters may be given priority over the other configuration parameters, such that they are to be defined prior to defining the configuration options for other configuration parameters. The priority may be indicated in the priority field 630 in the configuration model, or in another location accessible by the processing device. The size parameter 602 may be included in each of the configuration parameter groups, or in a majority of the configuration parameter groups, as the size parameter 602 may have a relationship with each of, or a majority of, the other configuration parameters. As such, the size parameter 602 may be given priority over other configuration parameters and may need to be defined prior to the other configuration parameters. One or more other parameters, such as parameters 604-610, may also, or alternatively, be given priority. After selection of an option for one or more parameters, such as the parameter(s) having priority, the other parameters may be set to a default or preselected value and/or price information may begin being displayed.

Figure 7:
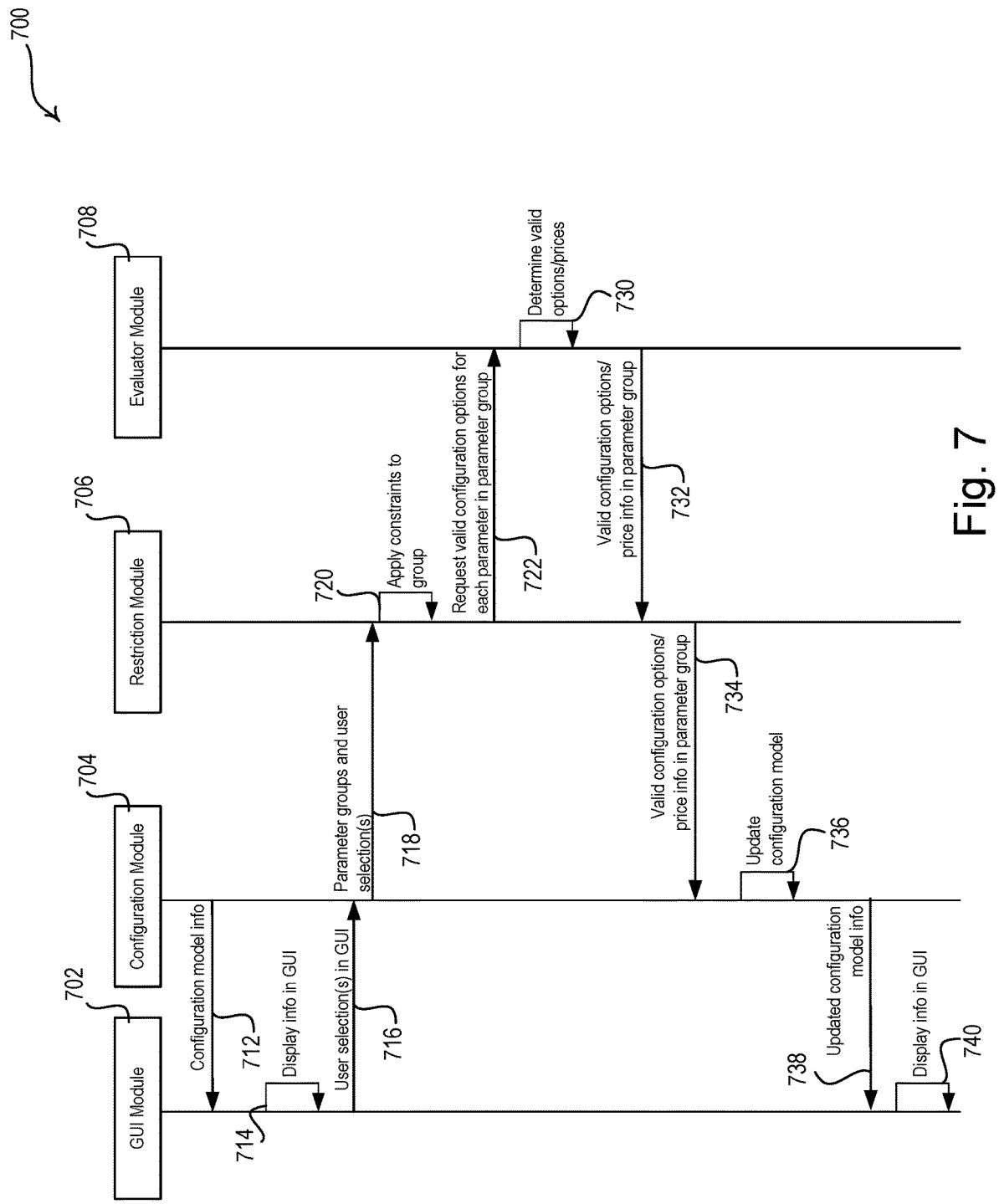
FIG. 7 is a system diagram of an example system for configuring control devices in response to user selection of configuration options.

FIG. 7 is a system diagram of an example system 700 for configuring control devices in response to user selection of configuration options for various parameters. The system 700 may implement a configuration model for updating and/or displaying configuration options for a filtered result set of control devices for a control device configuration system, such as the control device configuration system 200 shown in FIG. 2. As shown in FIG. 7, a configuration process, or portions thereof, may be implemented by one or more modules 702-708. The modules 702-708 may be software processes, hardware devices, or a combination thereof. One or more of the modules 702-708 may reside at a network device, such as the network devices 204a to 204n shown in FIG. 2, and/or an order management device, such as the order management device 202 shown in FIG. 2. One or more of the modules 702-708 may be implemented as part of a control device configuration application being executed on a single device, or distributed across multiple devices. Though certain functionality may be described herein as being performed by one or more modules 702-708, similar functionality may be performed on other modules.

The system 700 may include a graphical user interface (GUI) module 702, a configuration module 704, a restriction module 706, and/or an evaluator module 708. The configuration module 704 may store and maintain a configuration model for enabling faster processing of the control device configuration information and display of results in response to user selections of control device options for defining control device parameters. Each configuration model may have a configuration parameter definition for each configuration parameter that includes a name/identifier of the control device configuration parameter, a set of available options for the configuration parameter (e.g., a range of values, a list of options, a list of ranges, etc.), one or more group identifier(s), a selected option (from the set of options) selected by a user for the configuration parameter, valid configuration options, and/or priority information. The GUI module 702 may receive information in the configuration model for a given control device (e.g., shade type, lighting control device type, etc.) from the configuration module at 712. The GUI module 702 may use the information from the configuration model to display a user interface to the user at 714. The user interface may include the configuration options identified for each parameter in the configuration model. As a user makes one or more selections in the user interface (e.g., selections of configuration options for one or more configuration parameters, the selection of a maximum price, etc.) the GUI module 702 may update the configuration module 704 with the user selections by passing these selections to the configuration module 704.

The configuration module 704 may receive the user selections, at 716. The configuration module 704 may provide the user selections and the group identifiers of the configuration parameter groups corresponding to the user selections to the restriction module 706, at 718. The restriction module 706 and/or the evaluator module 708 may operate based on individual group identifiers of configuration parameter groups. Hence, the configuration module 704 may be viewed as calling the restriction module 706 on a per group basis. If a given configuration parameter fails to have a defined group in the configuration model, the configuration module 704 may provide a null value at 718, or fail to provide a group identifier to the restriction module 706. If a group fails to have any defined options by a user, the group may not be evaluated.

The restriction module 706 may determine, at 720, whether to apply certain constraints to a given configuration parameter group based on the user selections. For example, the restriction module 706 may apply a set of constraints on the user selections prior to applying the selections as filtering criteria on the control device configuration information. The constraints may be applied to ensure that the user has made appropriate selections for performing the filtering being requested. The restriction module 706 may identify the configuration parameter group of the parameter for which the user has made a selection and determine that the appropriate selections have been made for each of the parameters in the group to enable the filtering being requested. For example, if the restriction module 706 receives a selection of a configuration option for the coupler type parameter, which is in a configuration parameter group with the size parameter, but the user has failed to define a value for the size parameter, the constraints may fail to be applied to the configuration parameter group. This constraint may be applied as a determination may be unable to be made as to whether a coupler is even to be implemented in the configuration without the size parameter being defined. A coupler may be implemented in the configuration of a roller shade when the width of the roller shade is greater than a predefined measurement (e.g., one panel of a roller shade).

If the restriction module 706 determines that the filtering criteria may be applied to the control configuration information of the configuration parameter group based on the user selections, the restriction module 706 may call the evaluator module 708 at 722. If not, the restriction module 706 may return an error message to the configuration module 704, which may be displayed via the GUI module 702. The error message may identify the selections to be made by the user to perform the requested filtering.

After the appropriate selections are made by the user, the restriction module 706 may request the valid configuration options for each configuration parameter in the configuration parameter group at 722. The request, at 722, may provide the evaluator module 708 with the group identifier of the group of parameters associated with a user selection and the user selections. The evaluator module 708 may, for one or more configuration parameters in the group, apply the selected option(s) as filtering criteria to determine the valid configuration options (if any) of the set of available options for the configuration parameter(s) at 730. The evaluator module 708 may apply one or more rules that are specific to the group(s) of configuration parameters being defined by the selected configuration options.

Based on the rule(s) and the option(s) selected by the user for each configuration parameter in the configuration parameter group, the evaluator module 708 may (for one or more configuration parameters in the group) apply the selected options as filtering criteria on the control device configuration information to determine which option(s) (if any) of the set of available options for the configuration parameter are valid at 730. The evaluator module 708 may populate the valid options field of the definition of the configuration parameters in the configuration model. For example, referring to FIG. 6, the evaluator module 708 may populate the valid configuration options 628 for the configuration parameters that are a part of the configuration parameter group being evaluated. The valid configuration options may correspond to valid control devices that may be configured based on the user selections. Different groups may be evaluated in parallel at the evaluator module 708 to increase efficiency. For example, a different evaluator module may be implemented for evaluating each configuration parameter group to increase efficiency.

Referring back to FIG. 7, the system 700 may provide the user with a price or price range of control devices having the selected configuration based on the user's current selections. Price information may be updated by the evaluator module 708 at 730. The price information for devices in the configuration parameter group may be a part of the rules that are applied during the filtering performed by the evaluator module 708. The price information for each control device having options not within the valid options that are determined at 730 may be filtered. The resulting price or price range may be provided with the valid configuration options to the restriction module 706, at 732. The restriction module 706 may pass the valid configuration options/price information for each configuration parameter in the configuration parameter group back to the configuration module 704 at 734.

The configuration module 704 may update the configuration model at 736. The configuration module 704 may update the configuration model by combining the results from each configuration parameter group, which now includes an indication of the valid options for each configuration parameter. The configuration module 704 may use the price information from each configuration parameter group to provide a price/price range. The configuration module 704 may receive the results from multiple evaluator modules, which may each process the results for a configuration parameter group based on a selection, and aggregate the results from the evaluator modules. If the configuration module 704 has received a maximum price limitation, the configuration module 704 may further update the configuration model by filtering out the control devices and/or control device configuration options that would cause the price or price range to exceed the maximum price limitation.

Once a user has defined a set of options, the configuration module 706 will update the configuration model with the valid options for the parameters. When priority is implemented for one or more parameters, after the user has defined the set of options for the parameters having priority, the other parameters (e.g., the "additional parameters") may be automatically selected. For each additional parameter, the configuration module may look at the valid options and select one (e.g., the cheapest option or the most popular option).

The GUI module 704 may use the information from the updated configuration model to show the compatible/incompatible configuration options for each parameter. The compatible configuration options may be the valid options for a given configuration parameter. The other configuration options may be incompatible options based on previous user selections. The GUI module 704 may use the information from the updated configuration model to produce warnings, such as when a selected option for a given configuration parameter is an invalid or incompatible option.

As the GUI module 704 may display a user interface that identifies the compatible and incompatible options for a given configuration parameter, the user may select a configuration option that is incompatible with previously selected configuration options. If the user selects an incompatible configuration option, the user interface and/or the control device configuration application being executed by the system 700 may be operated in an invalid state. The GUI module 702 may identify the selection of an incompatible configuration option on the user interface and provide the user with an option to cancel the selection and make another selection or proceed with the selection of the incompatible configuration option. The incompatible configuration option may be provided as an invalid option to the configuration module 704 at 716.

The configuration module 704 may identify the selection of the invalid configuration option and maintain the current state of the valid configuration model as a separate version of the configuration model, which may be referred to as ConfigurationModelv1. The system 700 may proceed from 718-736 with the invalid configuration option being treated as a single configuration option defined by the user via the user interface. The system 700 may analyze the selected invalid configuration option as described herein to produce a separate configuration model. The configuration model produced in response to the previously selected invalid configuration option may be referred to as ConfigurationModelv2. ConfigurationModelv2 may include the valid configuration options for each of the other configuration parameters. The configuration module 704 may compare the selected options from ConfigurationModelv1 and the valid configuration options from ConfigurationModelv2 to determine which of the selection options from ConfigurationModelv1 may be removed/changed to allow selection of the invalid configuration option. The selected options to be removed/changed may be provided to the GUI module 702 in the updated configuration model info at 738. The GUI module 702 may display the selected options to be removed/changed at 740. If the user chooses to proceed with the previously incompatible configuration option, the previously selected options to be removed/changed may be set to a null value. The price information may be updated in the display to reflect the price of the control devices having the currently selected options.

The user may continue to make selections to narrow the valid control devices that meet the filtering criteria. Upon user selection, the GUI module 702 may display a list of the valid control devices that meet the filtering criteria selected by the user. The list of valid devices may be determined from the updated configuration model information provided by the configuration module 704. The user may select a control device for being ordered, configured, and/or implemented in a load control system. For example, the user may select a roller shade having the defined configuration parameters selected by the user.

After selecting a control device for being ordered, configured, and implemented, the user may define the configuration parameters for another control device. After the user has configured multiple control devices, the configuration module may perform a specification check across the selected control devices. The specification check may be performed to ensure that each of the selected control devices operate together. The specification check may be performed to ensure that each of the selected options for the control devices were intended by the user. For example, the specification check may be performed to identify to a user that the fabric type for two roller shades are different (e.g., different color, pattern, openness of fabric, etc.). The specification check may be performed to identify and/or remind a user of additional supplies that enable proper functioning of selected devices. For example, the specification check may be performed and a notification may be provided to the user of the number of power supplies needed for the number of roller shades selected. The specification check may also, or alternatively, be performed to check whether a user has enough of the correct dual shade brackets, enough main repeaters, enough of the correct interface modules, enough panel enclosure, or other additional supplies that may be implemented based on the selected control devices.

The system 700 and/or the configuration models may be implemented to provide a user in real time with an indication of whether a user has made a selection to build a valid control device, such as a motorized window shade or a lighting control device. As many control devices, such as a motorized window shade or a lighting control device, comprises many different configuration options for many configuration parameters to be defined, allowing a user to be notified in real time of an invalid selection prevents the inefficient use of resources (e.g., memory, processing power, etc.). As the price or price ranges of the control device may be updated as the device is being defined, the user may be on notice of the cost of selections being made in real time.

After selecting the control devices and/or additional supplies, the selected control devices may be ordered, configured, and/or installed in the load control system. The control devices may be implemented in the load control system as described herein. For example, a motorized window treatment or a lighting control device that is configured as described herein may be installed in a load control system, such as the load control system 100 shown in FIG. 1, and controlled as described herein.

Figure 8:
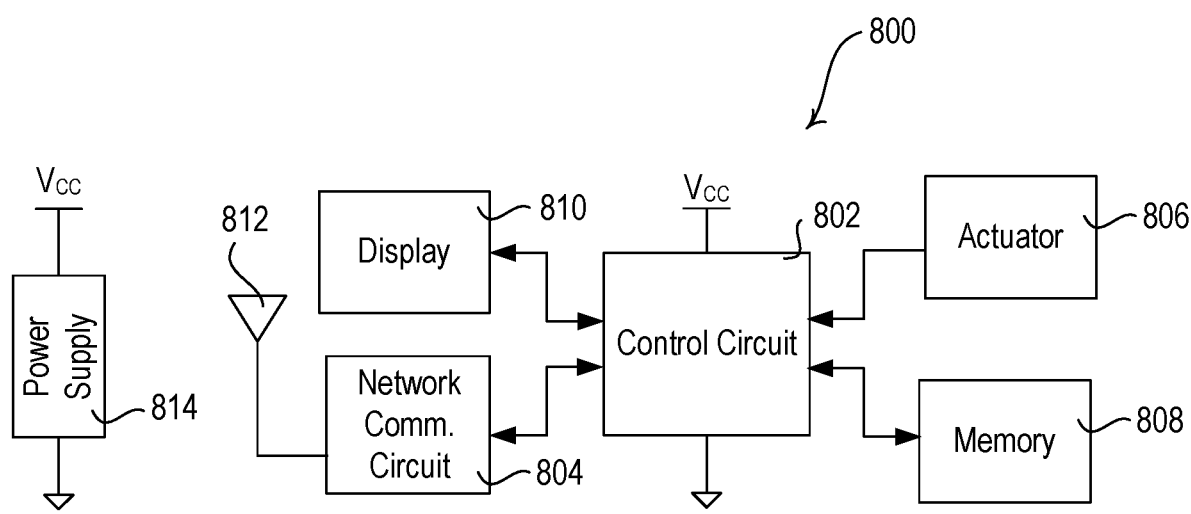
FIG. 8 is a block diagram illustrating an example computing device.

FIG. 8 is a block diagram illustrating an example computing device 800, such as the network device 166, the remote computing device 168, one or more network devices 204a-204n, and/or the order management device 202, for example. The computing device 800 may be a personal computer, a laptop, a tablet, a smart phone, and/or other suitable network communication device (e.g., an Internet-Protocol-enabled device), for example. The computing device 800 may be used to control and/or configure control of one or more load control devices, such as a motorized window treatment for example. The computing device 800 may comprise a control circuit 802, which may include one or more of a processor (e.g., a microprocessor), a microcontroller, a programmable logic device (PLD), a field programmable gate array (FPGA), an application specific integrated circuit (ASIC), or any suitable processing device. The control circuit 802 may perform signal coding, data processing, power control, image processing, input/output processing, and/or any other functionality that enables the computing device 800 to perform as described herein.

The control circuit 802 may store information in and/or retrieve information from the memory 808. The memory 808 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 802 may access the memory 808 for executable instructions and/or other information that may be used by the computing device 800. For example, the control circuit may access the memory 808 for executable instructions for executing the control device configuration application, or portions thereof. The control circuit 802 may store the unique identifiers (e.g., serial numbers) of the control devices to which the computing device 800 may be associated in the memory 808. The control circuit 802 may store in the memory 808 the control configuration information, filtering criteria, rules for filtering devices from the control configuration information, and/or other information that may be described for performing the embodiments described herein. The control circuit 802 may access instructions in the memory 808 for controlling and/or configuring control of one or more load control devices.

The computing device 800 may comprise a network communication circuit 804, which may be adapted to perform wired and/or wireless communications (e.g., with the system controller device 110 or another device over a network) on behalf of the computing device 800. The network communication circuit 804 may be a wireless communication circuit, for example, including an RF transceiver coupled to an antenna 812 for transmitting and/or receiving RF signals (e.g., the RF signals 106 shown in FIG. 1). The network communication circuit 804 may communicate using Wi-Fi, a proprietary protocol (e.g., the ClearConnect® protocol), Bluetooth®, or any other RF communications. The control circuit 802 may be coupled to the network communication circuit 804 for transmitting and/or receiving digital messages via RF signals.

The computing device 800 may comprise an actuator 806. The control circuit 802 may be responsive to the actuator 806 for receiving a user input. For example, the control circuit 802 may be operable to receive a button press from a user on the computing device 800 for making a selection or performing other functionality on the computing device 800.

The computing device 800 may comprise a display 810. The control circuit 802 may be in communication with a display 810 for displaying information to a user. The communication between the display 810 and the control circuit 802 may be a two way communication, as the display 810 may include a touch screen module capable of receiving information from a user and providing such information to the control circuit 802.

The computing device 800 may comprise a power supply 814 for generating a DC supply voltage $V_{CC}$ for powering the control circuit 802, the network communication circuit 804, the memory 808, the display 810, and/or other circuitry of the computing device 800. The power supply 814 may be a battery or another source of power for the computing device 800.

Figure 9:
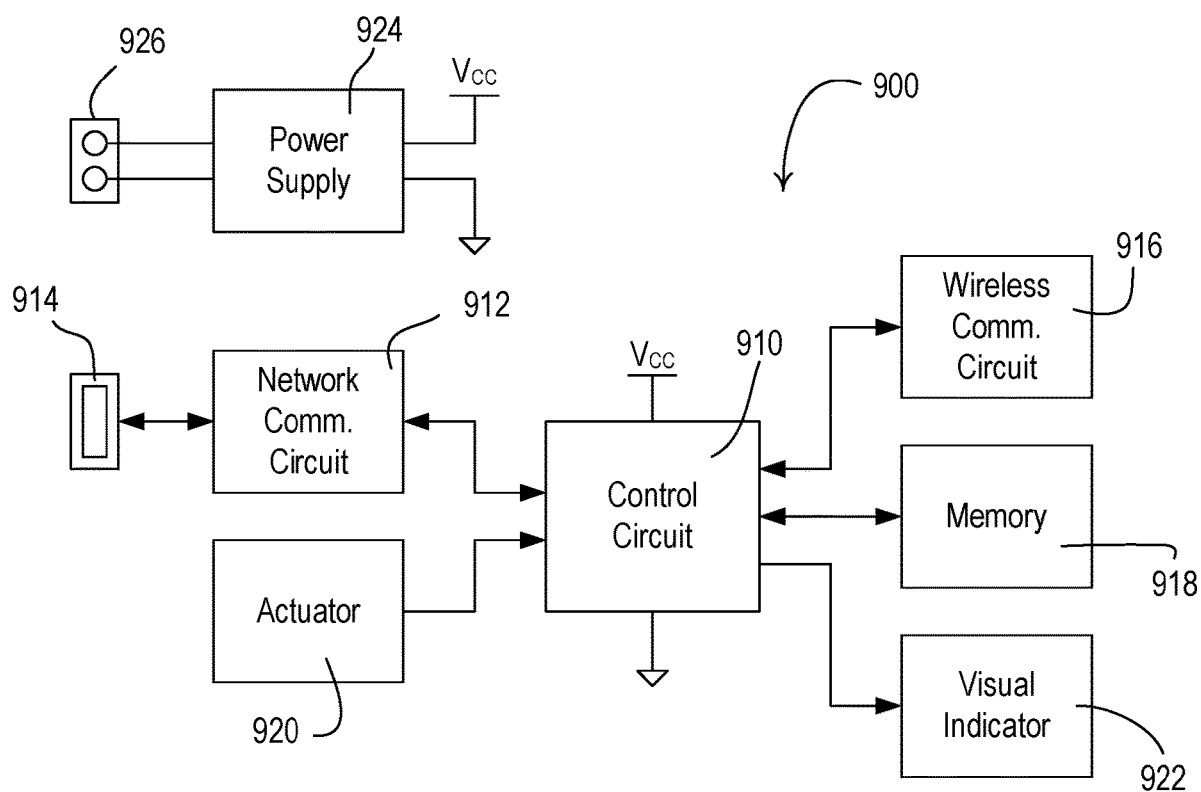
FIG. 9 is a block diagram illustrating an example system controller device.

FIG. 9 is a simplified block diagram of an example system controller device 900, which may be deployed as, for example, the system controller device 110 of the load control system 100 shown in FIG. 1. The system controller device 900 may comprise a control circuit 910, which may include one or more of a processor (e.g., a microprocessor), a microcontroller, a programmable logic device (PLD), a field programmable gate array (FPGA), an application specific integrated circuit (ASIC), or any suitable processing device. The control circuit 910 may perform signal coding, data processing, power control, input/output processing, and/or any other functionality that enables the system controller device 900 to perform as described herein. The system controller device 900 may comprise a network communication circuit 912 that may be coupled to a network connector 914 (e.g., an Ethernet jack), which may be adapted to be connected to a wired digital communication link (e.g., an Ethernet communication link) for allowing the control circuit 910 to communicate with network devices on a network. The network communication circuit 912 may be configured to be wirelessly connected to the network, e.g., using Wi-Fi technology to transmit and/or receive RF signals (e.g., the RF signals 106 shown in FIG. 1).

The system controller device 900 may comprise a wireless communication circuit 916, for example, including an RF transceiver coupled to an antenna for transmitting and/or receiving RF signals (e.g., the RF signals 106 shown in FIG. 1). The wireless communication circuit 916 may communicate using a proprietary protocol (e.g., the ClearConnect® protocol). The control circuit 910 may be coupled to the wireless communication circuit 916 for transmitting digital messages via the RF signals 106, for example, to control the load control devices in the load control system 100 in response to digital messages received via the network communication circuit 912. The control circuit 910 may be configured to receive digital messages, for example, from the load control devices and/or the input devices.

The control circuit 910 may be responsive to an actuator 920 for receiving a user input. For example, the control circuit 910 may be operable to associate the system controller device 900 with one or more control devices of the load control system 100 in response to actuations of the actuator 920 during a configuration procedure of the load control system 100. The system controller device 900 may comprise additional actuators to which the control circuit 910 may be responsive.

The control circuit 910 may store information in and/or retrieve information from the memory 918. The memory 918 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 910 may access the memory 918 for executable instructions and/or other information that may be used by the system controller device 900. The control circuit 910 may store the unique identifiers (e.g., serial numbers) of the control devices to which the system controller device 900 is associated in the memory 918.

The control circuit 910 may illuminate a visual indicator 922 to provide feedback to a user of the load control system 100. For example, the control circuit 910 may blink or strobe the visual indicator 922 to indicate a fault condition. The control circuit 910 may be operable to illuminate the visual indicator 922 different colors to indicator different conditions or states of the system controller device 900. The visual indicator 922 may be illuminated by, for example, one or more light-emitting diodes (LEDs). The system controller device 900 may comprise more than one visual indicator.

The system controller device 900 may comprise a power supply 924 for generating a DC supply voltage $V_{CC}$ for powering the control circuit 910, the network communication circuit 912, the wireless communication circuit 916, the memory 918, and/or other circuitry of the system controller device 900. The power supply 924 may be coupled to a power supply connector 926 (e.g., a USB port) for receiving a supply voltage (e.g., a DC voltage) and/or for drawing current from an external power source.

Figure 10:
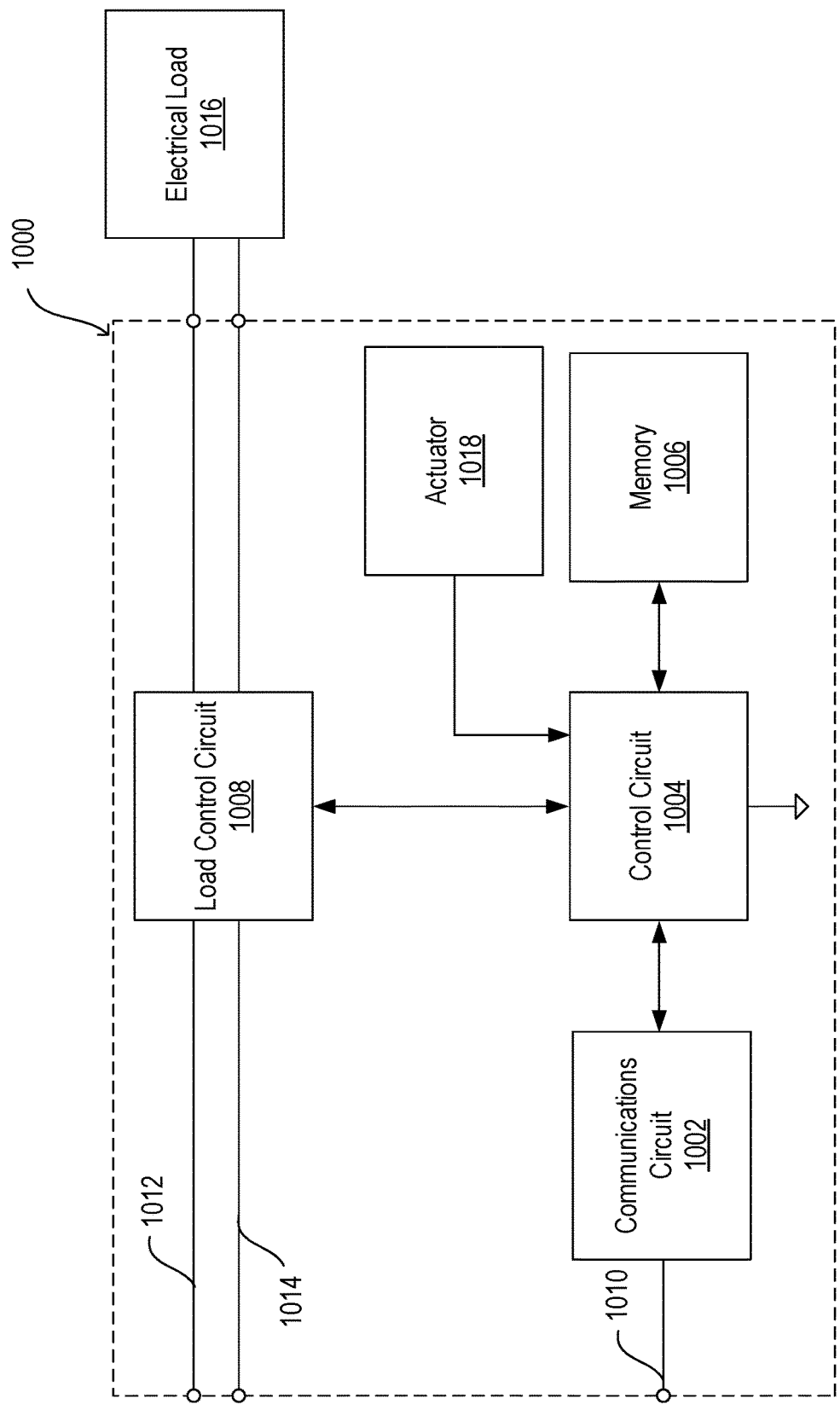
FIG. 10 is a block diagram illustrating an example control-target device.

FIG. 10 is a block diagram illustrating an example control-target device, e.g., a load control device 1000, as described herein. The load control device 1000 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 1000 may include a communications circuit 1002. The communications circuit 1002 may include a receiver, an RF transceiver, or other communications module capable of performing wired and/or wireless communications via communications link 1010. The communications circuit 1002 may be in communication with control circuit 1004. The control circuit 1004 may include one or more general purpose processors, special purpose processors, conventional processors, digital signal processors (DSPs), microprocessors, integrated circuits, a programmable logic device (PLD), application specific integrated circuits (ASICs), or the like. The control circuit 1004 may perform signal coding, data processing, power control, input/output processing, or any other functionality that enables the load control device 1000 to perform as described herein.

The control circuit 1004 may store information in and/or retrieve information from the memory 1006. For example, the memory 1006 may maintain a registry of associated control devices and/or control configuration instructions. The memory 1006 may include a non-removable memory and/or a removable memory. The load control circuit 1008 may receive instructions from the control circuit 1004 and may control the electrical load 1016 using the received instructions. The load control circuit 1008 may send status feedback to the control circuit 1004 regarding the status of the electrical load 1016. The load control circuit 1008 may receive power via the hot connection 1012 and the neutral connection 1014 and may provide an amount of power to the electrical load 1016. The electrical load 1016 may include any type of electrical load.

The control circuit 1004 may be in communication with an actuator 1018 (e.g., one or more buttons) that may be actuated by a user to communicate user selections to the control circuit 1004. For example, the actuator 1018 may be actuated to put the control circuit 1004 in an association mode and/or communicate association messages from the load control device 1000.

Figure 11:
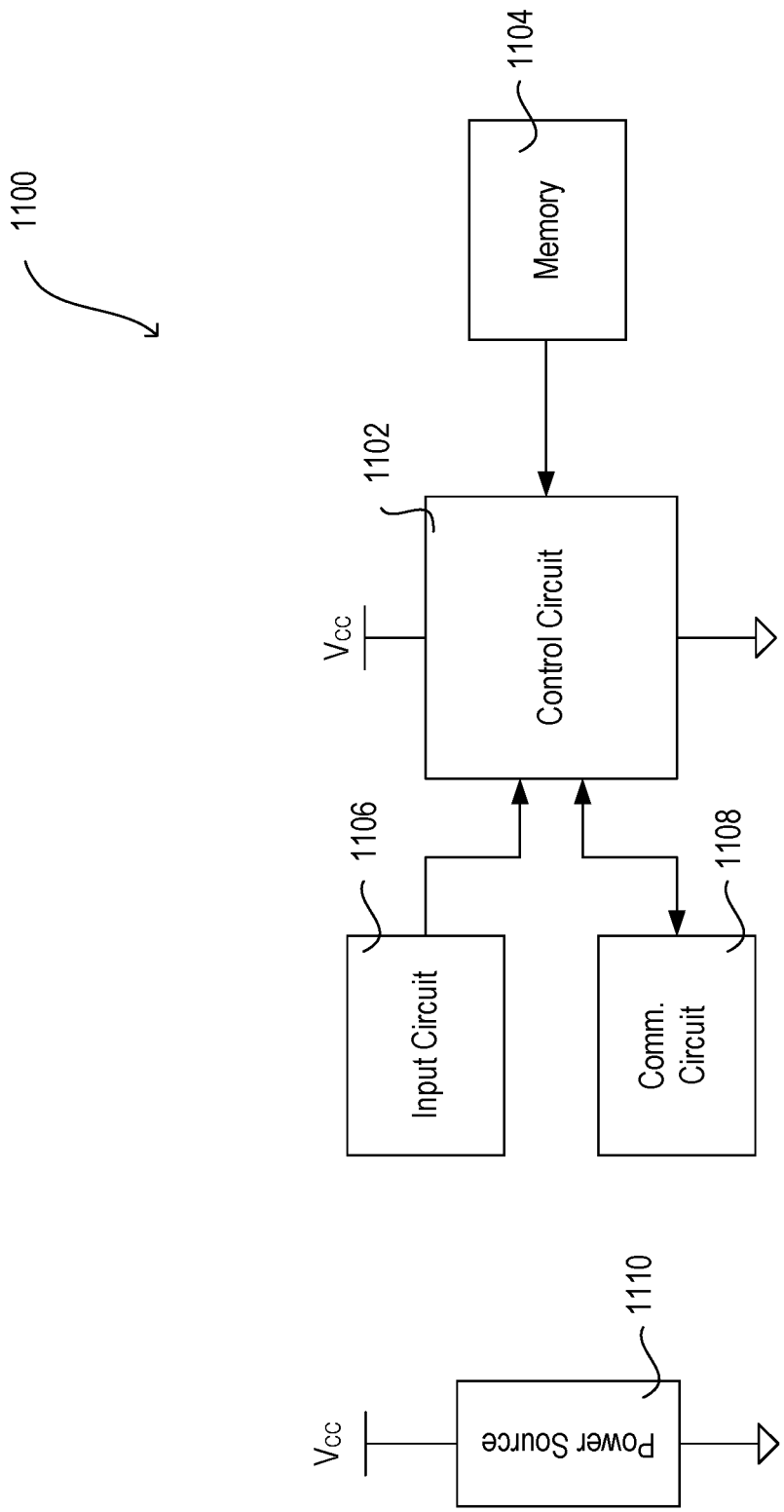
FIG. 11 is a block diagram illustrating an example control-source device.

FIG. 11 is a block diagram illustrating an example control-source device 1100 as described herein. The control-source device 1100 may be a remote control device, an occupancy sensor, a daylight sensor, a window sensor, a temperature sensor, and/or the like. The control-source device 1100 may include a control circuit 1102 for controlling the functionality of the control-source device 1100. The control circuit 1102 may include one or more general purpose processors, special purpose processors, conventional processors, digital signal processors (DSPs), microprocessors, integrated circuits, a programmable logic device (PLD), application specific integrated circuits (ASICs), or the like. The control circuit 1102 may perform signal coding, data processing, power control, input/output processing, or any other functionality that enables the control-source device 1100 to perform as described herein. The control circuit 1102 may store information in and/or retrieve information from the memory 1104. The memory 1104 may include a non-removable memory and/or a removable memory, as described herein.

The control-source device 1100 may include a communications circuit 1108 for transmitting and/or receiving information. The communications circuit 1108 may transmit and/or receive information via wired and/or wireless communications. The communications circuit 1108 may include a transmitter, an RF transceiver, or other circuit capable of performing wired and/or wireless communications. The communications circuit 1108 may be in communication with control circuit 1102 for transmitting and/or receiving information.

The control circuit 1102 may also be in communication with an input circuit 1106. The input circuit 1106 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device may receive input from the input circuit 1106 to put the control circuit 1102 in an association mode and/or communicate association messages from the control-source device. The control circuit 1102 may receive information from the input circuit 1106 (e.g., an indication that a button has been actuated or sensed information). Each of the modules within the network device 1100 may be powered by a power source 1110.

Although features and elements have been described in a particular order or relation to particular embodiments, many other variations, modifications, and other uses are apparent from the description provided herein. For example, while various types of hardware and/or software may be described for performing various features, other hardware and/or software modules may be implemented. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs). The disclosure herein may not be limited by the examples provided.

What is claimed is:
1. An electrical control target configuration controller, comprising:
    a display device; and
    control circuitry communicatively coupled to the display device, the control circuitry to:
        cause a display of a graphical user interface (GUI) that includes a plurality of electrical control-target device entry fields;
        generate an electrical control-target device configuration model that includes a plurality of user selectable electrical control-target device parameters that define at least one electrical control-target device;
        iteratively, for each the plurality of electrical control-target device entry fields, responsive to selection of respective ones of the plurality of electrical control-target device entry fields:
            determine, based on the electrical control-target device configuration model, one or more available parameters associated with the respective electrical control-target device entry field and one or more non-available parameters associated with the respective electrical control-target device entry field;
            cause a display of the one or more available parameters and the one or more non-available param- eters, wherein the one or more non-available parameters includes an explanation for non-availability;

responsive to a user selection of one of the listed available parameters:
update the electrical control-target device configuration model; and
responsive to a user selection of one of the listed non-available parameters, for each prior-selected parameter that caused the non-availability of the user selected non-available parameter:
cause a display of a list of revised prior-selected parameters based on the current parameter selection
receive an input indicative of a revised prior-selected parameter; and
update the electrical control-target device configuration model with the current parameter and the revised prior selected parameter.

2. The controller of claim 1 wherein to display the one or more non-available parameters that includes the explanation for non-availability, the control circuitry to further:
display the one or more non-available parameters that include at least one parameter electrically incompatible with the electrical control-target device configuration model.

3. The controller of claim 1 wherein to display the one or more non-available parameters that includes the explanation for non-availability, the control circuitry to further:
display the one or more non-available parameters that include at least one parameter physically incompatible with the electrical control-target device configuration model.

4. The controller of claim 1 wherein to display the one or more non-available parameters that includes the explanation for non-availability, the control circuitry to further:
display the one or more non-available parameters that include at least one parameter aesthetically incompatible with the electrical control-target device configuration model.

5. The controller of claim 1 wherein the control circuitry to further:
calculate an estimated cost of the electrical control-target device based on the electrical control-target device configuration model; and
cause the GUI to display the estimated cost of the electrical control-target device.

6. An electrical control target configuration method, comprising:
causing, by control circuitry, a display of a graphical user interface (GUI) that includes a plurality of electrical control-target device entry fields on a communicatively coupled display device;
generating, by the control circuitry, an electrical control-target device configuration model that includes a plurality of user selectable electrical control-target device parameters that define at least one electrical control-target device;
iteratively, for each the plurality of electrical control-target device entry fields and responsive to selection of respective ones of the plurality of electrical control-target device entry fields:
determining, by the control circuitry, one or more available parameters associated with the respective electrical control-target device entry field and one or more non-available parameters associated with the respective electrical control-target device entry field based on the electrical control-target device configuration model;
causing, by the control circuitry, a display of the one or more available parameters and the one or more non-available parameters, wherein the one or more non-available parameters includes an explanation for non-availability;
responsive to a user selection of one of the listed available parameters:
updating, by the control circuitry, the electrical control-target device configuration model; and
responsive to a user selection of one of the listed non-available parameters, for each prior-selected parameter that caused the non-availability of the user selected non-available parameter:
causing, by the control circuitry, a display of a list of revised prior-selected parameters based on the current parameter selection
receiving, by the control circuitry, an input indicative of a revised prior-selected parameter; and
updating, by the control circuitry, the electrical control-target device configuration model with the current parameter and the revised prior selected parameter.

7. The method of claim 6 wherein causing the display of the one or more non-available parameters that includes the explanation for non-availability, further comprises:
causing, by the control circuitry, the display of the one or more non-available parameters that include at least one parameter electrically incompatible with the electrical control-target device configuration model.

8. The method of claim 6 wherein causing the display of the one or more non-available parameters that includes the explanation for non-availability, further comprises:
causing, by the control circuitry, the display of the one or more non-available parameters that include at least one parameter physically incompatible with the electrical control-target device configuration model.

9. The method of claim 6 wherein causing the display of the one or more non-available parameters that includes the explanation for non-availability, further comprises:
causing, by the control circuitry, the display of the one or more non-available parameters that include at least one parameter aesthetically incompatible with the electrical control-target device configuration model.

10. The method of claim 6, further comprising:
calculating, by the control circuitry, an estimated cost of the electrical control-target device based on the electrical control-target device configuration model; and
causing, by the control circuitry, a display of the estimated cost of the electrical control-target device.

11. A non-transitory, machine-readable, storage device that includes instructions that, when executed by electrical control target configuration control circuitry, cause the control circuitry to:
cause a display of a graphical user interface (GUI) that includes a plurality of electrical control-target device entry fields on a communicatively coupled display device;
generate an electrical control-target device configuration model that includes a plurality of user selectable electrical control-target device parameters that define at least one electrical control-target device;

iteratively, for each the plurality of electrical control-target device entry fields and responsive to selection of respective ones of the plurality of electrical control-target device entry fields:
  determine one or more available parameters associated with the respective electrical control-target device entry field and one or more non-available parameters associated with the respective electrical control-target device entry field based on the electrical control-target device configuration model;
  cause a display of the one or more available parameters and the one or more non-available parameters, wherein the one or more non-available parameters includes an explanation for non-availability;
  responsive to a user selection of one of the listed available parameters:
    update the electrical control-target device configuration model; and
  responsive to a user selection of one of the listed non-available parameters, for each prior-selected parameter that caused the non-availability of the user selected non-available parameter:
    cause a display of a list of revised prior-selected parameters based on the current parameter selection
    receive an input indicative of a revised prior-selected parameter; and
    update the electrical control-target device configuration model with the current parameter and the revised prior selected parameter.

12. The non-transitory, machine-readable, storage device of claim 11 wherein the instructions that cause the electrical control target configuration control circuitry to cause the display of the one or more non-available parameters that includes the explanation for non-availability, further cause the control circuitry to:
  cause the display of the one or more non-available parameters that include at least one parameter electrically incompatible with the electrical control-target device configuration model.

13. The non-transitory, machine-readable, storage device of claim 11 wherein the instructions that cause the electrical control target configuration control circuitry to cause the display of the one or more non-available parameters that includes the explanation for non-availability, further cause the control circuitry to:
  cause the display of the one or more non-available parameters that include at least one parameter physically incompatible with the electrical control-target device configuration model.

14. The non-transitory, machine-readable, storage device of claim 11 wherein the instructions that cause the electrical control target configuration control circuitry to cause the display of the one or more non-available parameters that includes the explanation for non-availability, further cause the control circuitry to:
  cause by the control circuitry, the display of the one or more non-available parameters that include at least one parameter aesthetically incompatible with the electrical control-target device configuration model.

15. The non-transitory, machine-readable, storage device of claim 11 wherein the instructions, when executed by the electrical control target configuration control circuitry, further cause the control circuitry to:
  calculate an estimated cost of the electrical control-target device based on the electrical control-target device configuration model; and
  cause a display of the estimated cost of the electrical control-target device.

* * * * *